United States Patent
Kashanin et al.

(10) Patent No.: US 11,808,686 B2
(45) Date of Patent: Nov. 7, 2023

(54) SYSTEM AND METHOD FOR IMPROVED IDENTIFICATION OF PARTICLES OR CELLS

(71) Applicant: Cellix Limited, Dublin (IE)

(72) Inventors: Dmitry Kashanin, Dublin (IE); Igor Shvets, Dublin (IE)

(73) Assignee: Cellix Limited, Dublin (IE)

(*) Notice: Subject to any disclaimer, the term of this patent is extended or adjusted under 35 U.S.C. 154(b) by 503 days.

(21) Appl. No.: 16/625,451

(22) PCT Filed: Jun. 25, 2018

(86) PCT No.: PCT/EP2018/067002
§ 371 (c)(1),
(2) Date: Dec. 20, 2019

(87) PCT Pub. No.: WO2018/234589
PCT Pub. Date: Dec. 27, 2018

(65) Prior Publication Data
US 2021/0148805 A1    May 20, 2021

(30) Foreign Application Priority Data
Jun. 23, 2017  (EP) .................................. 17177662

(51) Int. Cl.
*G01N 15/10*    (2006.01)
(52) U.S. Cl.
CPC ..... *G01N 15/1031* (2013.01); *G01N 15/1056* (2013.01); *G01N 2015/1006* (2013.01); *G01N 2015/1093* (2013.01)
(58) Field of Classification Search
CPC ........... G01F 1/58; G01F 1/586; G01F 1/588; G01N 1/584; G01N 15/1056;
(Continued)

(56) References Cited

U.S. PATENT DOCUMENTS

| | | | | |
|---|---|---|---|---|
| 6,703,819 B2 * | 3/2004 | Gascoyne | .......... | G01N 15/1218 324/71.4 |
| 2011/0279130 A1 | 11/2011 | Reccius et al. | | |

(Continued)

FOREIGN PATENT DOCUMENTS

| | | |
|---|---|---|
| EP | 1624967 B1 * | 3/2009 |
| JP | 2003107099 A | 4/2003 |
| WO | 2008125081 A1 | 10/2008 |

OTHER PUBLICATIONS

Federica Caselli et al. "EIT-Inspired Microfluidic Cytometer for Single-Cell Dielectric Spectroscopy", Journal of Microelectromechanical Systems, IEEE Service Center, US, vol. 19, No. 5, Oct. 1, 2010, 1057-7157 (12 pages).

(Continued)

*Primary Examiner* — Hoa Q Pham
(74) *Attorney, Agent, or Firm* — Bookoff McAndrews, PLLC

(57) ABSTRACT

This invention relates to the field of microfluidic flow cytometry and more generally microfluidic techniques for analysis of particulate-containing fluids. It deals with the improvements to such technologies in order to identify subsets of particles or sub-populations of cells that differ in their properties, and, if necessary, separate the said identified sub-populations of cells, e.g. sex of semen cells, alive cells from the dead ones, cancerous cells from the healthy ones, subsets of viruses, bacteria or subsets of particles. This invention disclosure deals with the apparatus and the method for detection of cells or particles based on measurements of complex AC impedance between electrodes across the flow of fluid containing such cells or particles.

14 Claims, 13 Drawing Sheets

(58) Field of Classification Search
CPC ........... G01N 15/1227; G01N 15/1031; G01N 15/459; G01N 15/1404; G01N 2015/1254; G01N 2015/1093; G01N 2015/1006; G01N 2015/149; B01L 3/502761; B01L 3/502753; B01L 2300/0645
USPC ............... 356/335–343; 324/649; 73/861.12; 702/45
See application file for complete search history.

(56) References Cited

U.S. PATENT DOCUMENTS

| | | |
|---|---|---|
| 2012/0084022 A1 | 4/2012 | Giovangrandi et al. |
| 2014/0072963 A1* | 3/2014 | Qin .......................... C09B 57/10 435/7.1 |
| 2021/0331169 A1* | 10/2021 | Kashanin .......... B01L 3/502761 |

OTHER PUBLICATIONS

Federicia Caselli et al. "Modeling, Simulation, and Performance Evaluation of a Novel Microfluidic Impedance Cytometer for Morphology-Based Cell Discrimination", Journal of Microelectromechanical Systems, IEEE Service Center, US, vol. 23, No. 4, Aug. 1, 2014, pp. 785-879 (10 pages).
International Search Report in corresponding Application No. PCT/EP2018/067002, dated Sep. 26, 2018 (20 pages).

* cited by examiner

Drawings

SYSTEM AND METHOD FOR IMPROVED IDENTIFICATION OF PARTICLES OR CELLS

CROSS-REFERENCE TO RELATED APPLICATION(S)

This application is the U.S. national stage entry under 35 U.S.C. § 371 of International Application No. PCT/EP2018/067002, filed on Jun. 25, 2018, which claims priority to European Patent Application No. 17177662.8, filed on Jun. 23, 2017.

FIELD

This invention deals with improvements to systems, methods, devices and instruments for counting and/or identification of particles in particulate-containing fluids such as e.g. flow cytometry or particle flow analyser.

BACKGROUND

For the purpose of this invention the term "particles" will be used to describe solid particles, e.g. particles of metals, oxides, nitrides, sulphides, polymer particles and particles of numerous other inorganic and organics materials, also mixed particles containing blends and composites of materials within individual particles and various nano- and microparticles and clusters. The term will also be used to describe soft particles e.g. protein or fatty particles or indeed blends of soft particles and their compositions, blends and compositions involving soft matter materials and solid matter materials in each particle. The term will also be used to describe cells, e.g. mammalian cells, sperm cells, blood cells and any other cells.

The term "anisotropic" refers to being not spherical in overall symmetry of particle's shape or its response to the stimulus used in the apparatus. In the simplest case, this refers to overall shape of the particle (cell). For example, if the particle is elongated, ellipsoidal, bar-shaped or disk-shaped, discoid, this is then described as anisotropic in contrast to a spherical shape particle that is being described as isotropic. However, the overall shape in its own right is insufficient to distinguish between anisotropic and isotropic particles (cells). For example, if a conducting rod (a segment of wire) is embedded into an insulating sphere, this forms an anisotropic particle even if the overall shape of the particle is spherical, i.e. isotropic. The reason is that such a particle has different response to the alternating (AC) electromagnetic field depending on whether it is directed with the length of the rod along the field or perpendicular to the field. The main response to the AC field will be in this case from the metallic rod, this response will be highly anisotropic, the insulating spherical envelope will have little effect on the situation. The same applies to optical response: it will be different depending on the direction of the light incidence and the polarization with respect to the long axis of the rod, again the effect of the isotropic dielectric envelope on the optical response will not alter anisotropic response from the conducting rod significantly. The same applies to the cells. The main contribution to AC signal response from a cell may not come from the exterior periphery of the cell but from its interior features or its membrane. This depends on the structure of the cell and the AC frequency.

When referring to laminar flow regime, it shall imply the flow conditions that fall under the Stokes regime ($-1<Re<-1000$). Re is the Reynolds number defined as $Re=\rho UH/\mu$, where $\rho$, $U$ and $\mu$, are the fluid density, the average velocity and dynamic viscosity respectively and H is the characteristic channel dimension. In some cases the effect of particle focusing may still be achieved when Reynolds number is below 1 and therefore the invention is not restricted to the situation of $-1<Re<1000$. Generally the range of Re values at which the focusing is achieved, also depends on the difference between the densities of the liquid and the density of the particles.

In recent years, microfluidic impedance cytometry has been further developed to count and discriminate between different kinds of cells. Multi-frequency impedance measurements can be used to determine the electrical properties of single cells in a microchip [S. Gawad, L. Schild, P. H. Renaud, Micromachined impedance spectroscopy flow cytometer for cell analysis and particle sizing, Lab. Chip. 2001 1 76-82].

Typical impedance measurement scheme described in the state-of-the-art utilize detection of particles (cells) based on a lock-in amplifier measurement and AC impedance spectroscopy measurements. A lock-in amplifier is a type of amplifier that can extract a minute signal due to particle (cell) passing through the detection area from a noisy environment. Depending on the dynamic reserve of the instrument, signals up to one million times smaller than noise components and relatively close in frequency, can still be reliably detected and segregated. Lock-in amplifier is generally used to detect and measure very small AC signals, in the range of a few nanoVolts. The measured value is complex AC impedance between two electrodes separated by the fluid in the microchannel. The most important part of this amplifier is a digital low-pass filter, the part that isolates the frequency of interest and eliminates the higher frequencies and noise. In order to achieve a real-time analysis of the cells with the rate of up to many thousands of cells per second, the detection system must be very fast.

The amplifier is essentially a homodyne detector followed by low pass filter. Homodyne detector is a device that detects frequency-modulated signal by non-linear mixing it with a signal having the same frequency as the modulation signal. Whereas conventional lock-in amplifiers use analogue frequency mixers and R-C filters for the demodulation, state of art instruments have both steps implemented by fast digital signal processing for example using Field Programmable Gate Array (FPGA). FPGA is an integrated digital circuit whose logic behaviour and component mapping is programmable. Sine and cosine demodulation is performed simultaneously, which is sometimes also referred to as dual phase demodulation as displayed in FIG. 1c.

Operation of a lock-in amplifier relies on the orthogonality of sinusoidal functions. When a sinusoidal function of frequency $f_1$ is multiplied by another sinusoidal function of frequency $f_2$ not equal to $f_1$ and the product is integrated over a time much longer than the period of the two functions, the result is zero. Instead, when $f_1$ is equal to $f_2$ and the two functions are in phase, the average value is equal to half of the product of the amplitudes.

A lock-in amplifier takes the input signal, multiplies it by the reference signal (either provided from the internal oscillator or an external source), and integrates it over a specified time, usually on the order of milliseconds to a few seconds. The resulting signal is a DC signal, where the contribution from any signal that is not at the same frequency as the reference signal, is attenuated close to zero. The out-of-phase component of the signal that has the same frequency as the reference signal is also attenuated (because sine functions are orthogonal to the cosine functions of the same frequency), making a lock-in a phase-sensitive detector (PSD).

Usually, lock-in amplifiers generate their own internal reference signal by a phase-locked-loop (PLL) locked to the external reference. The external reference, the lock-in's reference, and the signal are shown in the FIG. 1a. The internal reference is $V_L \sin(\omega_L t + \theta_{ref})$, where $\omega_L$ is the angular frequency of the signal and $\theta_{ref}$ is the phase of the reference signal.

The lock-in amplifies the signal and then multiplies it by the lock-in reference using a phase-sensitive detector or multiplier. The output of the PSD is simply the product of two sine waves.

$$V_{psd} = V_{sig} V_L \sin(\omega_r t + \theta_{sig}) \sin(\omega_L t + \theta_{ref}) = \quad (1.1)$$

$$= \frac{1}{2} V_{sig} V_L \cos([\omega_r - \omega_L]t + \theta_{sig} - \theta_{ref}) -$$

$$\frac{1}{2} V_{sig} V_L \cos([\omega_r + \omega_L]t + \theta_{sig} + \theta_{ref})$$

The PSD output is two AC signals, one at the difference frequency $[\omega_r - \omega_L]$ and the other one at sum frequency $[\omega_r + \omega_L]$. Then the PSD output passes through a low pass filter and the AC signals are removed.

If $\omega_r$ equals $\omega_L$, the difference frequency component in eq. (1.1) will be a DC signal. So, the filtered PSD output will be:

$$V_{psd} = \frac{1}{2} V_{sig} V_L \cos(\theta_{sig} - \theta_{ref}) \quad (1.2)$$

which is a DC signal proportional to the signal amplitude.

The general structure of a lock-in amplifier is shown in FIG. 1b. Unlike in analogue amplifiers, in a digital lock-in the signal and reference are converted into a digital form by A/D converters and are represented by sequences of numbers. Multiplication and filtering are performed mathematically by a digital signal processing (DSP). The phase sensitive detectors (PSDs) in the digital lock-in act as linear multipliers; that is, they multiply the signal by a reference sine wave. Analogue PSDs (both square wave and linear) have many problems associated with them such as output offsets and gain error. Output offset is a problem of analogue lock-ins because the signal of interest is a DC output from the PSD, and an output offset contributes to error and zero drift. The offset problems of analogue PSDs are eliminated using the digital multiplication of the signal and the reference. Analogue sine-wave generators are susceptible to amplitude drift: especially as a function of temperature. In contrast, the digital reference sine wave has a precise fixed amplitude. This avoids a major source of gain error common to analogue lock-ins. For applications that require high precision, short detection time, digital lock-in amplifiers are preferred to the analogue ones. Flow-cytometry is one such application.

FIG. 2 describes how the digital lock-in can be used to detect and identify particles in a microfluidic channel 2 using the approach of AC impedance spectroscopy. The analogue input is a modulated signal that passes through a particle-containing fluid. It is applied as AC voltage at excitation frequency $f_0$ between detection electrodes 5a, 5b, 5c and 5d normally positioned on both sides of a common microfluidic channel 2 in the detection area 5. The voltage is applied to one set of the two opposite sets of electrodes 5a and 5c and the signal is taken from the second set of electrodes 5b and 5d and sent to the lock-in amplifier 15. The signal is a complex function of the impedance of the cell, impedance of the elements of the cell, impedance of the fluid surrounding the cell, dielectric properties of the cell and its elements, dielectric properties of the fluid carrying the cell 3a, the shape of the electrodes, size of the cell compared to the size of the electrodes, position of the sell with respect to the electrodes and orientation of the cell with respect to the electrodes. Dielectric properties of the cell and the fluid as well as impedance of the cell and the fluid are complex functions with real and imaginary components. All these also depend of the excitation frequency $f_0$.

Complete analytical description of the system in terms of the first principles is too complex and is far beyond the scope of this document. However, the complete analytical description is also unnecessary for the detection and identification of cells. The detection of cells is based on changes in the signal send to the lock-in amplifier resulting from the individual passing cells. The identification of the single particles (cells) is based on a principle: identical particles (cells) positioned in the same way with respect to the electrodes, will produce identical signals.

The signal induced is normally very small and it comes against significant noise background and therefore lock-in detection is used to demodulate the signal, extract it from the noise and measure it. What is crucial to our analysis is that the signal from the particles (cells) comes at frequency $f_0$, the same as the excitation frequency. After multiplying the modulated signal by a sinusoid with frequency $f_1$, a sum of sinusoids with different frequencies is obtained, i.e. a combination of modulation frequency and reference frequency, as described above. By applying the correct type of filter is possible to isolate the sinusoid with the frequency $f_0$ that is of interest. After the demodulation, the signal must be sent via low-pass filter. There are number of options for the low-pass filter such as: FIR (Finite length Impulse Response) filters and IIR (Infinite length Impulse Response) filters. IIR filters contain feedback, whereas FIR filters do not. As a result the nth output sample, y[n], of an FIR filter is a function of only a finite number of samples of input sequence, whereas the nth sample of an IIR filter may depend upon an infinite number of samples. FIR filters are mostly implemented directly using a relation similar to the convolution sum, although they can also be implemented using discrete Fourier transforms (DFTs). The implementation of the measurement scheme is displayed in FIG. 1c.

The paper [T. Sun and H. Morgan, Single-cell microfluidic impedance cytometry: a review, Microfluid. Nanofluid, 2010, 8, 423-443] describes several methods where cells flow between miniature electrodes which have an AC field applied across them. As the cell passes between the electrodes, the current path is disturbed and the change in current gives a change in the impedance signal associated with a single cell. Usually, impedance measurements at the frequency of (1-5 MHz) give information on the cell membrane capacitance whilst much higher frequencies (>10 MHz) probe the internal properties of the cell. Two or more frequencies can be applied simultaneously to differentiate different types of cells.

Impedance flow spectroscopy methods of cell detection were investigated where two pairs of electrodes are used similar to configuration described in ["Microfluidic impedance cytometer for platelet analysis", Mikael Evander et. al, Lab on a chip, volume 13, 2013], each pair having an excitation and measurement electrodes. An AC voltage at radio frequency from 100 KHz-100 MHz is applied to an excitation electrodes and an electrical current is measured by the measurement electrodes. The electrical current being measured is then amplified and converted into an output voltage. The output signal is then demodulated to remove excitation frequency and to recover impedance magnitude and phase. As a cell passes through the pair of excitation and measurement electrodes, impedance magnitude and phase change, thus recording the information about the cell properties. Additional pair of electrodes ensures measurement is differential thus eliminating parasitic electromagnetic noise. Typically, the impedance measurements are taken at low frequency: 100 KHZ-2 MHz to acquire information about the cell size and at high frequency 2-100 MHz to acquire information about the cytoplasm and internal properties of the cell.

FIGS. 3a and 3b displays density plot of impedance magnitude versus phase for a population of identical polystyrene beads. The beads are polystyrene beads of 6 micrometer in diameter. In that experiment the channel is of a square cross-section (30 micrometers×30 micrometers) and there are two electrodes deposited on the channel with the size of 20 micrometers×0.2 micrometers: the top electrode deposited on the upper wall of the channel (ceiling of the channel) is the excitation electrode and the electrode at the lower wall of the channel (floor of the channel) is the detection electrode. When particles pass in between the excitation and the detection electrode, they induce a significant variation in complex value of impedance comprised of variations in the magnitude of the impedance and also the variation in the phase of the impedance, equivalent to variation in real and imaginary parts of impedance. FIG. 3a demonstrates that at low frequency (0.5 MHz), the impedance signal depends on the cell size and also on the cell position within the microfluidic channel. Moreover, it demonstrates that signal is different for the cells flowing at the top of the channel and close to excitation electrode versus those flowing at the bottom of the channel and close to measurement electrode. The difference is partly due to non-uniformity of the electric field between two electrodes of a finite width. Additionally, there are differences of electric field gradient at the top and at the bottom of the channel; especially, the electric field gradient is greater at the excitation electrode compared to the one at the measurement electrode. This also contributes to the sensitivity of impedance signal to the cell position at high frequencies in FIG. 3b. It is important to note that in measurements of polystyrene beads, no hydrodynamic focusing or positioning of the sample are employed, and yet achieved separation of homogeneous population into several distinct subpopulations.

Impedance flow cytometry can readily detect a cell, and the original technique was developed by Coulter for this. When it comes to more challenging task of separating the sub-populations of cells within the sample fluid, the performance of the impedance cytometry is much less convincing due to large spread in the data points corresponding to each cell. Hydrodynamic focusing is particularly important for the detection of cells and particles on a chip utilizing impedance measurements. Indeed, for identification of cells (or particles) it is necessary to arrange these in such a flow that they pass in front of the detection system one by one. This "one cell-by-one cell" principle is fundamental for the successful cell identification: one needs to avoid the situation of multiple cells passing through the detection system at once as it could prevent the identification. It is common to use hydrodynamic focusing to achieve this. Hydrodynamic focusing is based on injection of the sample fluid into the laminar flow of sheath fluid. The two flows then merge into to a single channel, usually of a reduced cross-section. This reduces the cross-sections of both, the sheath fluid part of the flow and also the sample liquid flow, and thus achieves the desired reduction in the cross-section of the sample fluid flow. To control the cross-section of the sample fluid, one can change the flow rates of the sample fluid and sheath fluid. In relation to the electrical impedance based cytometry, hydrodynamic focusing reduces the width of the conductive sample stream to the appropriate size of the cells, increasing the percentage resistance change in the conductive path when a cell passes by.

In recent years there is increasing body of work on the use of hydrodynamic focusing in microfluidic chips and microchannels. For example, the Japanese patent laid-open No 2003-107099 discloses a "fractionation microchip having a channel for introducing a particulate-containing solution, and a sheath flow forming channel arranged on at least one lateral side of the of the introducing channel. The particulate fractionation microchip disclosed in Patent 2003-107099, is so designed that fluid laminar flows are formed by a "trifurcated channel" having a channel for introducing a particulate-containing solution and two sheath flow-forming channels. In essence this is a 2D hydrodynamic focusing on a chip. Similar approach is described in [R. Rodriguez-Trujillo, C. Mills, J. Samitier, G. Gomila, Microfluid. Nanofluid, 3 171 (2007)] and [P. Walsh, E. Walsh, M. Davies, Int. J. Heat Fluid Flow 28 44 (2007)].

There are also solutions for integration of 3-D hydrodynamic focusing with a conventional type microfluidic chip described in ["Three-dimensional hydrodynamic focusing in a microfluidic Coulter counter", R. Scott, P. Sethu, C. K. Harnett, Rev. Sci. Instruments 79 046104 (2008)]. A similar approach is described in ["Universally applicable three-dimensional hydrodynamic microfluidic flow focusing" Yu-Jui Chiu, S. H. Cho, Z. Mei, V. Lien, T. F. Wu, Y. H. Lo, Lab Chip 2013 13 1803]. That study deals with three-dimensional hydrodynamic focusing where the sample channel and the two sheath channels having a greater height than the sample channel, join at the junction before the main channel which has the same height as the sheath channel. The merging of channels of different heights produces flow confinement both in the lateral and transverse directions, resulting in 3D focused flow. In the patent WO 2008/125081 A1 Theisen Janko et al provides the method for focusing fluid in microfluidic channel structure and the implementation of such a microfluidic structure to achieve hydrodynamic focusing of fluid. In the patent US 2009/0283148 A1, Shinoda et. al. [US 2009/0283148 A1, "Microchip and channel structure for the same", Masataka Shinoda, May 4 2009] teaches the method of three dimensional hydrodynamic focusing where the microtube is inserted into the microchip to providing the sample flow.

Despite these efforts, integration of 3D hydrodynamic focusing with microfluidic chip is not simple and the performance of such on-chip 3D focusing has limited capability. To reduce the variation of the impedance flow cytometry measurements, it is desirable to be able to direct the sample flow through a well-defined point in between the electrodes, e.g. the centre of the channel. This reduces the spread in the data points from a single population of cells of type of particles in the flow. It may also be desirable to align all the cells (particles) in the same way with respect to the direction of the electric field created by the electrodes. Cells often do not have an overall spherical shape but are rather elongated, ellipsoidal or discoid in shape. The signal from the cell in electrical impedance cytometry device depends on the orientation of the elongated axis of the cell with respect to the electrodes. The key conclusion for the review of the state-of-art is the following: it would be highly desirable to have means of extracting information on inaccuracies of particles position and alignment without or in combination with positioning or aligning particles (cells) and use it to reduce the spread of data points from individual particles (cells) in order to improve their identification and separation into subsets.

A paper by F. Caseilli et. al. (F. Ceselli, P. Bisegna, F. Maceri, "EIT-inspired microfluidic cytometer for single-cell dielectrics spectroscopy", Journ. of Microelectromechanical Systems, V 19, No 5, (2010) 1029-1040) described a computer-simulation in-silico study of a microfluidic system that can measure electric characteristics of single cells passing along microfluidic channel simultaneously along several directions in one plane. The system proposed utilises two electrodes passing current perpendicular to the flow direction and four other electrodes, all located in the same plane perpendicular to the flow direction, altogether making six coupled electrodes. Six voltages are measured in the same plane, and a distributed cytomer model is built taking conductance and admittance values so detected. The model suggests that such a system if built could detect anisotropy of the cells thus providing more information on each passing cell. Another paper that involves some of the same group of authors (F. Caselli, M. Shaker, L. Colella, P. Reanud, P. Bisegna, "Modelling Simulation, and Performance Evaluation of a novel microfluidic impedance cytometer for morphology-based cell discrimination", Journ. of Microelectromechanical Systems, V 23, No 4, (2014) 785-794) points that the model developed previously is too complex to be realised using planar fabrication techniques and proposes a simpler in-silico model that in view of the authors could be easier to implement in a real device. The model is designed to obtain information of the cell anisotropy expressed as cell anisotropy indexes which at the same time should be insensitive to the volume of the cell. The model utilises a single flow channel with two electrodes positioned along the channel on the bottom side of the channel and separated by a distance along the direction of the flow. There are two or one channels intersecting the flow channel and each of them also has two further electrodes, one on each side of the channel. As the cell passes the intersection point between the two channels, there are two measurements conducted at once. The authors model how the information on the cell anisotropy could be extracted from the two measurements: along the flow channel and perpendicular to it.

It is an object therefore to provide an improved method, system, device and instrument for counting and/or identification of particles in a particulate-containing fluid.

SUMMARY

According to the invention there is provided, as set out in the appended claims, a system for identification of particles/cells comprising:
at least one microfluidic channel configured to sustain a flow of a sample fluid through said microfluidic channel and carrying the particles/cells along the channel;
at least a first group of detection electrodes and a second group of detection electrodes, wherein each group comprises at least one excitation electrode connected to an AC voltage/current source and at least one signal electrode connected to a detector;
said first and second groups of detection electrodes are adapted to generate different electric fields having two different directions and configured to enable measurement of at least two electric characteristics of the individual particles/cells along two different directions defined by the directions of said electric fields;
wherein each electric characteristic is measured between the signal electrode and the excitation electrode within the first group of detection electrodes and where travelling particles/cells clear through the part of the microfluidic channel energised by the first group of detection electrodes before entering the part of the microfluidic channel energised by the second group of electrodes.

The invention is applicable to technologies that can perform counting and identification of particles and/or cells in a microfluidic chip format as opposed to analysis using large scale cytometers. The said microfluidic chip has at least one microfluidic channel where such counting and identification takes place in the detection area (zone) of the channel. The invention provides a system and method of counting and identification based on AC electrical impedance spectroscopy. The invention deals with the cells that are anisotropic in their characteristics that is measured in the detection area. For example, if the detection is based on AC electrical impedance spectroscopy, particles (cells) that have their complex AC electrical impedance characteristics dependent on the direction of the electric field and/or current are referenced. This anisotropy of the particle (cell) could come from the anisotropy of the overall shape of the particle (cells) or anisotropy of the impedance characteristics of its structure and or texture. For example this could be the anisotropy of electrical characteristics of the nucleus of the cells or its membrane. The invention describes an apparatus for more robust counting or identification of the cells and the related method.

In one embodiment the two groups of detection electrodes are positioned at different points along the flow direction.

In one embodiment the directions of the electric fields created by these two groups are substantially non-collinear.

In one embodiment there is provided a third group of detection electrodes having at least one excitation electrode and at least one signal electrode; and the directions of the electric fields created by the first, second and third groups are substantially non-collinear.

In one embodiment each of the excitation electrodes in the first, second or third group of detection electrodes comprises at least two sub-electrodes connected to the same AC voltage/current source and at least two signal electrodes in each group of detection electrodes connected a differential amplifier/comparator configured for improved signal-to-noise ratio.

In one embodiment the detector connected to the signal electrodes comprises a narrow-band-pass amplifier tuned to a frequency ω of the AC voltage/current source connected to the excitation electrode of the same group of detection electrodes.

In one embodiment the detector connected to the signal electrode comprises a lock-in amplifiers or phase-sensitive amplifier or demodulator tuned to a frequency ω of the AC voltage/current source.

In one embodiment there is provided a means or module for exciting the excitation electrodes for different groups of detection electrodes at different frequencies.

In one embodiment there is at least one shielding electrode positioned upstream from one group of detection electrodes and downstream from another group of detection electrodes.

In one embodiment the excitation electrodes for different groups of detection electrodes are excited at different frequencies.

In one embodiment the particles/cells are mammalian cells or clusters of such cells.

In one embodiment the cells are X- and Y-chromosome bearing semen cells.

In one embodiment there is provided a module for calculating weighted vector sum of the signals measured by each group of the detection electrodes, such vector sum is determined by the angle between the directions of the fields created by each group of detection electrodes and making the calculation for single passing particle/cell; and identifying of the particle/cell on the basis on an analysis of said calculation.

In one embodiment the cell is a semen cell and the identification implies identification of the sex of the cell.

In another embodiment there is provided a method for identification of cells comprising the steps of supplying a flow of cells carried by a sample fluid in a one-by-one manner through the microfluidic channel of a system; detecting at least two signals from at least two groups of detection electrodes; measuring AC electric characteristics of passing cells along at least two non-collinear directions and calculating a vector sum of the at least two signals that is defined by the amplitudes of the at least two signals measured at each set of the detection electrodes and by the angle between the directions of the fields created by each of the groups of detection electrodes.

In another embodiment there is provided a method for identification of types of cells comprising supplying a flow of cells carried by a sample fluid in a one-by-one manner through the system as claimed in claim 1; detecting at least two signals from at least two groups of detection electrodes measuring electric characteristics of the cells along at least two non-collinear directions and calculating a re-normalised vector sum of at least two signal amplitudes that is defined by the values of the signals measured at each set of the detection electrodes and by the angle between the directions of the fields created by the two groups of detection electrodes where the re-normalisation introduces re-calibration coefficients for some of the signal amplitudes: such coefficients are calculated to minimise scattering of data points from an ensemble of identical cells by a numerical data fitting algorithm.

In on embodiment the vector sum is calculated as a complex vector resulting from addition of complex vector components, each vector component is defined by real and imaginary part of the signal from each set of the detection electrodes.

In one embodiment the cells are sperm cells and the calculated vector sum is used as an indicator of the sex of the semen cells.

In one embodiment the invention provides a microfluidic device capable of robust discrimination between subsets of particles or subsets (subpopulations) of cells in a microfluidic flow format and method for using the same.

In one embodiment the invention provides a device and microfluidic chip suitable for separation between X- and Y-chromosome bearing sperm cells, in particular for the bovine and/or equestrian sperm cells and method for using the same.

In one embodiment the invention extracts information on the orientation alignment and/or position of anisotropic particles, cells, and mammalian cells, sperm cells in order to be able to use this information for more accurate identification of cells and particles and more robust separation between subsets of these.

In one embodiment the invention extracts information on the orientation alignment and/or position of anisotropic particles, cells, mammalian cells, sperm cells under conditions of flow in a microfluidic channel.

In one embodiment the invention provides a means for identifying anisotropic particles (cells) having the desired direction of the alignment of the particles (cells) with respect to the detection electrodes, where such electrodes are positioned along the microfluidic channel and such electrodes are used for detecting the particles (cells) by the method of AC impedance.

In one embodiment the invention provides a device and microfluidic chip that can measure the position of the particles (cells) flowing through a microfluidic channel with respect to the walls of the said channel.

In one embodiment the invention reduces the spread of the data points resulting from a population of anisotropic particles (cells) resulting from their inconsistent alignment and/or inconsistent positioning in a microfluidic channel and as a result make the identification of the particles, cells, sperm cells, bacteria more robust.

For many common envisaged applications in this invention, the particles in the fluid are cells, and particulate containing fluid could be a suspension of mammalian cells, semen, blood cells, viruses, bacteria or indeed any other type of isolated particles. However, the technology could also be used with numerous other types of particles: organic, inorganic, ceramic, composite, nanoparticles, etc., both solid, semi-solid or liquid (e.g. protein particles or drops of one liquid in the stream of another one). It will appreciated use of the term "particle" or "cell" to cover any and all of these. Moreover the liquid/fluid carrying such particles in microfluidic channel can be referred to as sample fluid, or particle containing fluid.

In one embodiment the electrodes are positioned directly on the walls of the common microfluidic channel, typically along two opposite sides of the channel and usually in direct electric contact with the fluid inside the channel. The detection is done by energising one or more detection electrodes and detecting AC complex signal comprising the amplitude and the phase of the information from other detection electrodes using phase-sensitive detector that is also sometimes referred to as lock-in amplifier. The cells are arranged to pass in between the electrodes of the detection area in a one-by-one manner. The signal is altered by each passing cell or particle, and the identification of the cells or particles is done by analysing amplitude and phase characteristics of the signal measured by the lock-in amplifier and their dependencies on the frequency of the AC signal energising the detection electrodes. This method is called AC impedance spectroscopy.

The invention teaches that in order to reduce the statistical spread of data measured from a set of cells or particles by impedance spectroscopy, they need to be consistently and reproducibly positioned in the common microfluidic channel with respect to the detection electrodes as the signal detected depends on the position of the particles (cells). The orientation of a cell or particle with respect to the detection electrodes is important in the case of particles (cells) that are not circular in shape, e.g. elongated, elliptical or discoid. One can call such particles anisotropic in contrast to sphere-like cells or particles. It will be appreciated that even a particle (cell) of a sphere-like overall shape can still be anisotropic if its interior AC electric characteristics are orientation-dependent. The orientation of the particle (cell) defines the change in AC impedance induced between the electrodes from such single passing anisotropic particles (cells).

The invention stresses that there are known devices and methods enabling uniform positioning of particles (cells) within a channel of microfluidic chip, as well as methods for alignment of anisotropic cells in microfluidic chips. All these help to reduce the spread of data points produced by a population of particles (cells). However, any further reduction in the spread of the data points or any further means for identifying particles (cells) from a given spread of data point is highly desirable as it would make identification of particles (cells) more robust.

The invention describes describe a device and method for more accurate identification of cells in microfluidic channel. The invention allows extracting further information from a set of data points obtained using AC impedance spectrometer to take into account error in the signal resulting from variation in the cell position and alignment. Most of the embodiments presented in the document work in conjunction with the identification of cells (particles) using AC impedance spectroscopy. Other methods of particles (cells) identification, e.g. fluorescence detection or optical scattering, can also be used with the same outcome: reduce the uncertainty of the particles (cells) identification resulting from the variation of their position and orientation and therefore make the particle (cell) identification more robust.

In one embodiment there is provided a method for identification of cells comprising the steps of supplying a flow of cells carried by a sample fluid in a one-by-one manner through the microfluidic channel of a system; the method comprising the steps of:
  detecting at least two signals from at least two groups of detection electrodes;
  measuring AC electric characteristics of passing cells along at least two non-collinear direction of passing cells; and
  calculating a vector sum of the at least two signals that is defined by the amplitudes of the at least two signals measured at each set of the detection electrodes and by the angle between the directions of the fields created by each of the groups of detection electrodes.

In another embodiment there is provided a method for identification of types of cells comprising supplying a flow of cells carried by a sample fluid in a one-by-one manner through a system; the method comprising the steps of:
  detecting at least two signals from at least two groups of detection electrodes measuring electric characteristics of the cells along at least two non-collinear directions;
  forming vectors where the value of the vector is represented by the amplitude of the signal, and the direction of the vector in space is represented by the direction of the field in a given set of detection electrodes;
  calculating a vector sum of the said vectors multiplied by different calibration coefficients of such vectors to establish overall electric characteristics of the cells and where such calibration coefficients are calculated to minimise scattering of data points from a plurality of identical cells by a numerical data fitting algorithm.

In one embodiment the calibration coefficients are equal to unity.

In one embodiment the signal from each detection electrode contains two components representing a real and an imaginary part of the electric characteristics of the cell and two vector sums are calculated, one out of real and one out of imaginary components.

In another embodiment there is provided a system for identification of particles/cells comprising:
  at least one microfluidic channel configured to sustain a flow of a sample fluid through said microfluidic channel and carrying the particles/cells along the channel in one-by-one manner;
  at least a first group of detection electrodes and a second group of detection electrodes, wherein each group comprises at least one excitation electrode connected to an AC voltage/current source and at least one signal electrode connected to a detector;
  the said groups of detection electrodes are separated by a distance along the length of the microfluidic channel;
  there is at least one shielding electrode positioned in between the said two groups of detection electrodes, the said at least one shielding electrode is connected to a fixed potential;
  said first and second groups of detection electrodes are adapted to generate different electric fields having two different directions and configured to enable measurement of at least two electric characteristics of the individual particles/cells along two different directions defined by the directions of said electric fields;
  wherein each electric characteristic is measured between the signal electrode and the excitation electrode within each group of detection electrodes and where travelling particles/cells clear through the part of the microfluidic channel energised by the first group of detection electrodes before entering the part of the microfluidic channel energised by the second group of electrodes.

BRIEF DESCRIPTION OF THE DRAWINGS

The invention will be more clearly understood from the following description of an embodiment thereof, given by way of example only, with reference to the accompanying drawings, in which:—

FIG. 4b is a detailed view of the microfluidic chip shown in FIG. 4a;

FIGS. 11a and 11b illustrates cross-sections along Y axis (perpendicular to the flow direction) for another embodiment of the microfluidic chip where one set of detection electrodes (FIG. 11b) is made using dielectric layer separating fraction of the electrodes from the interior of the microfluidic channel;

DETAILED DESCRIPTION OF THE DRAWINGS

Figure 1A:
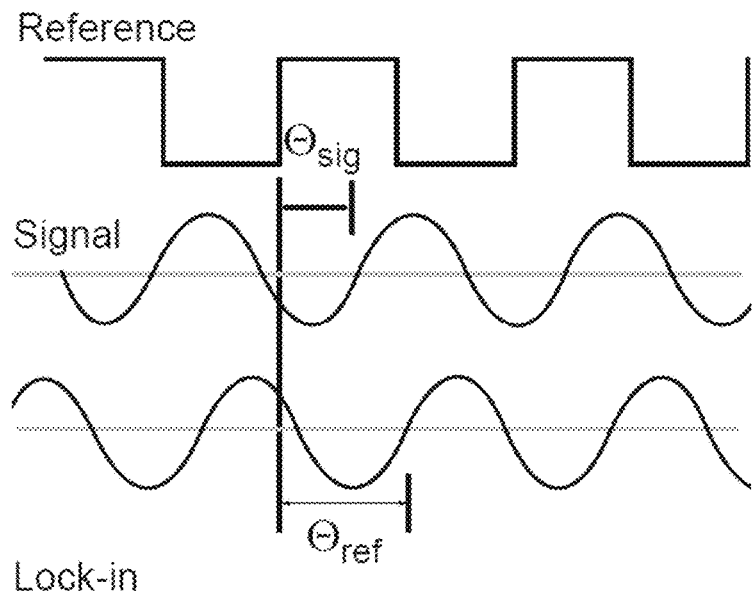
FIG. 1a illustrates operation of phase-locked loop (PLL) of lock-in amplifier with external reference signal.
Figure 1B:
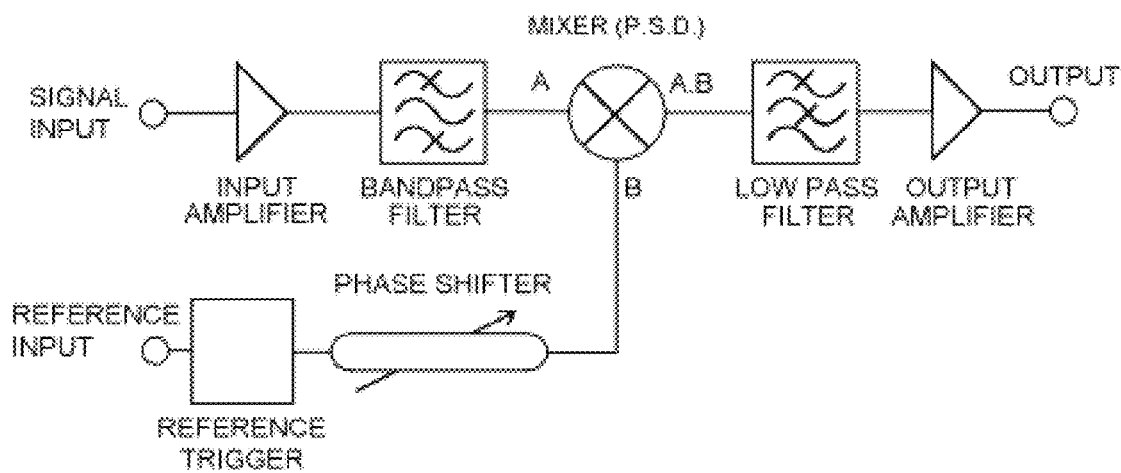
FIG. 1b illustrates a conceptual block diagram of a lock-in amplifier.
Figure 1C:
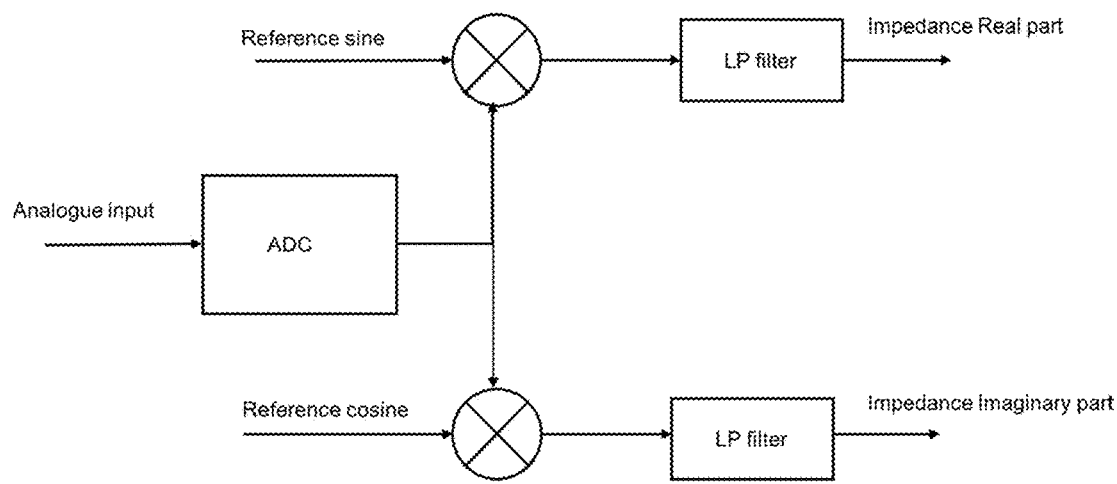
FIG. 1c illustrates a conceptual block diagram of digital lock-in amplifier using internal reference and demodulating real and imaginary parts of impedance.
Figure 2:
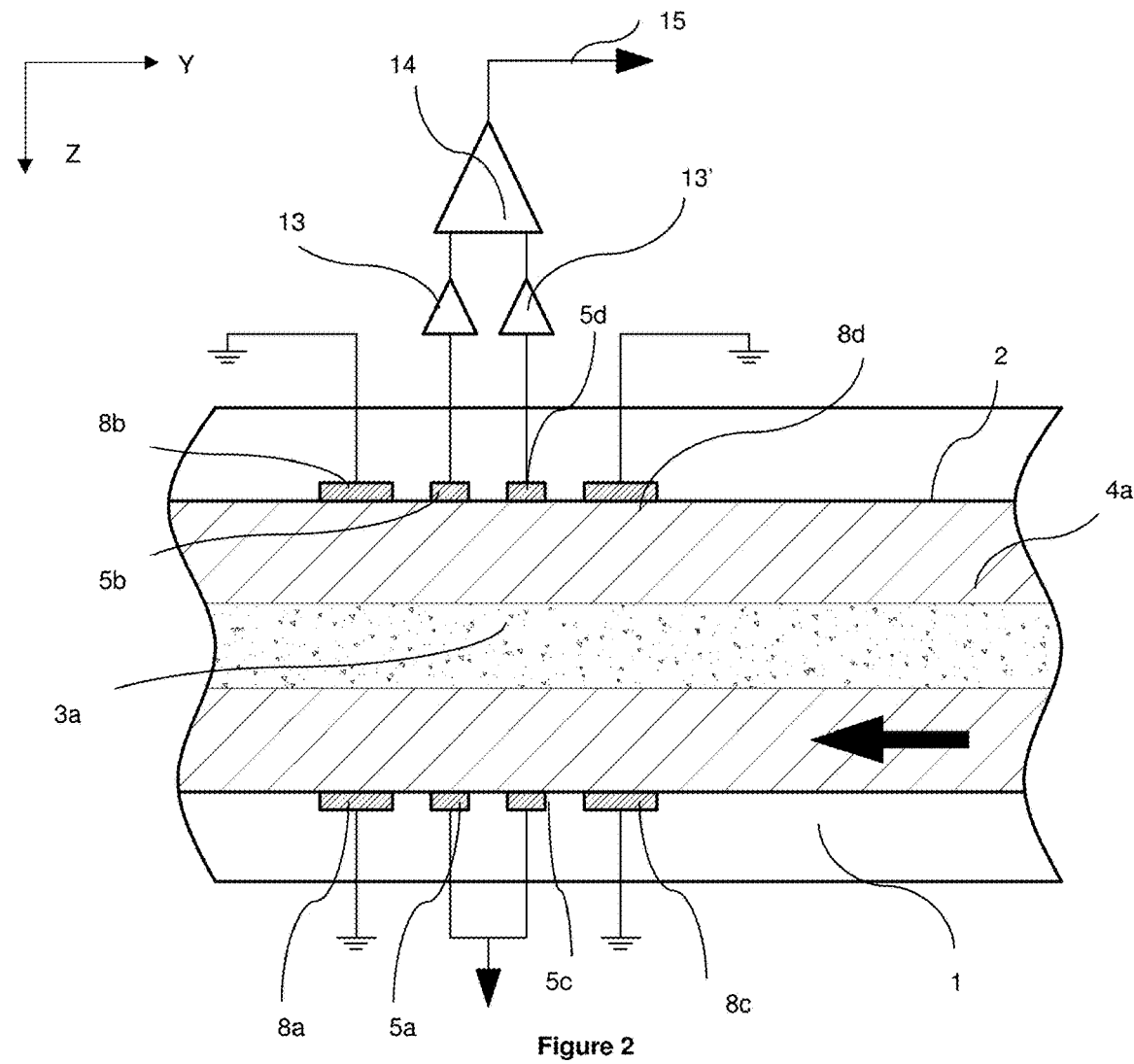
FIG. 2 illustrates a number of schematics of AC impedance detection in a microfluidic channel showing cross-section along the channel with four detection electrodes and two shielding electrodes
Figure 3A:
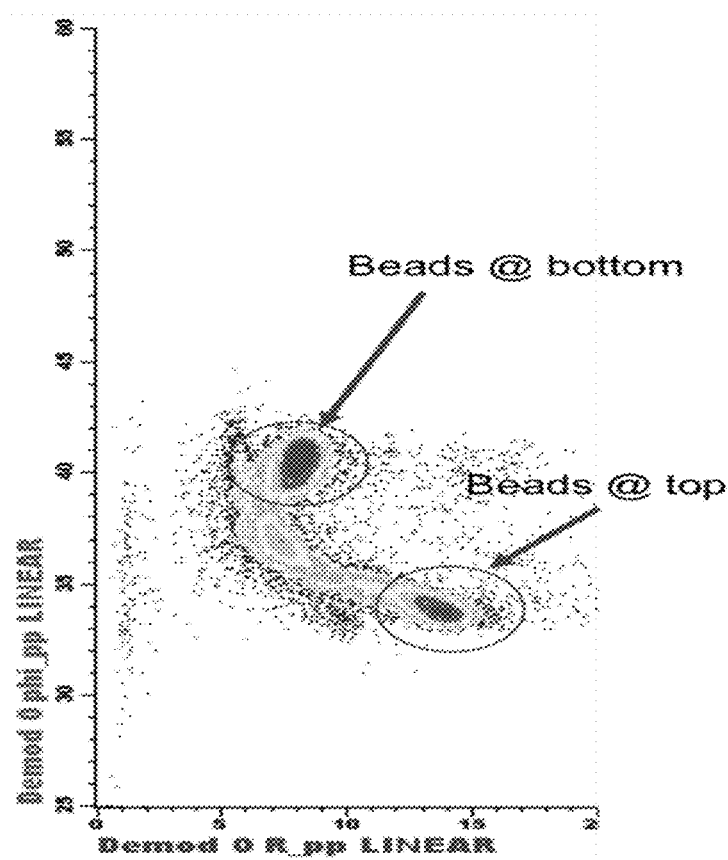
FIG. 3a illustrates a density plot of impedance magnitude versus impedance phase measured at excitation frequency 0.5 MHz for a population of identical polystyrene beads suspended in phosphate saline buffer.
Figure 3B:
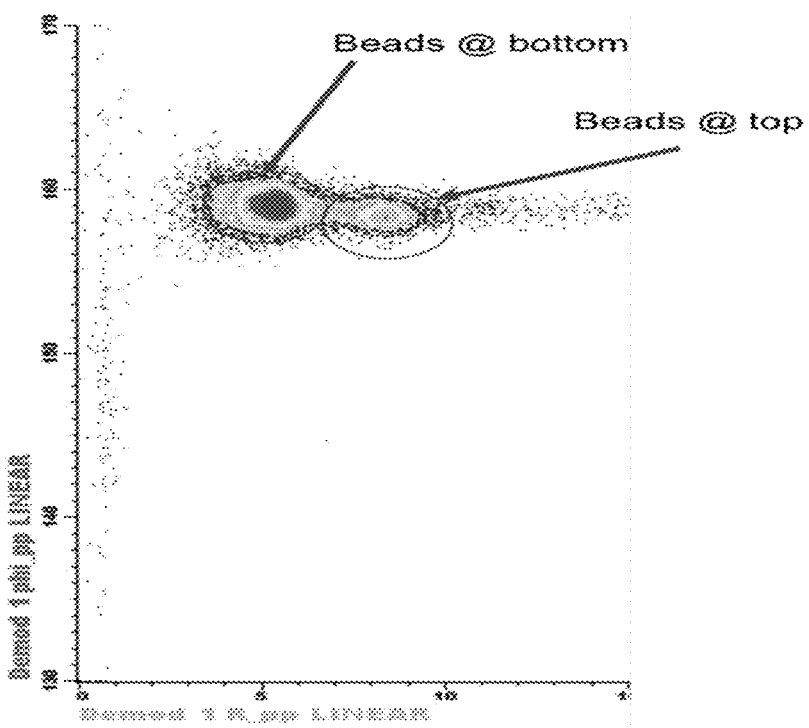
FIG. 3b illustrates a density plot of impedance magnitude versus impedance phase measured at excitation frequency 10 MHz for a population of identical polystyrene beads suspended in phosphate saline buffer.
Figure 4A:
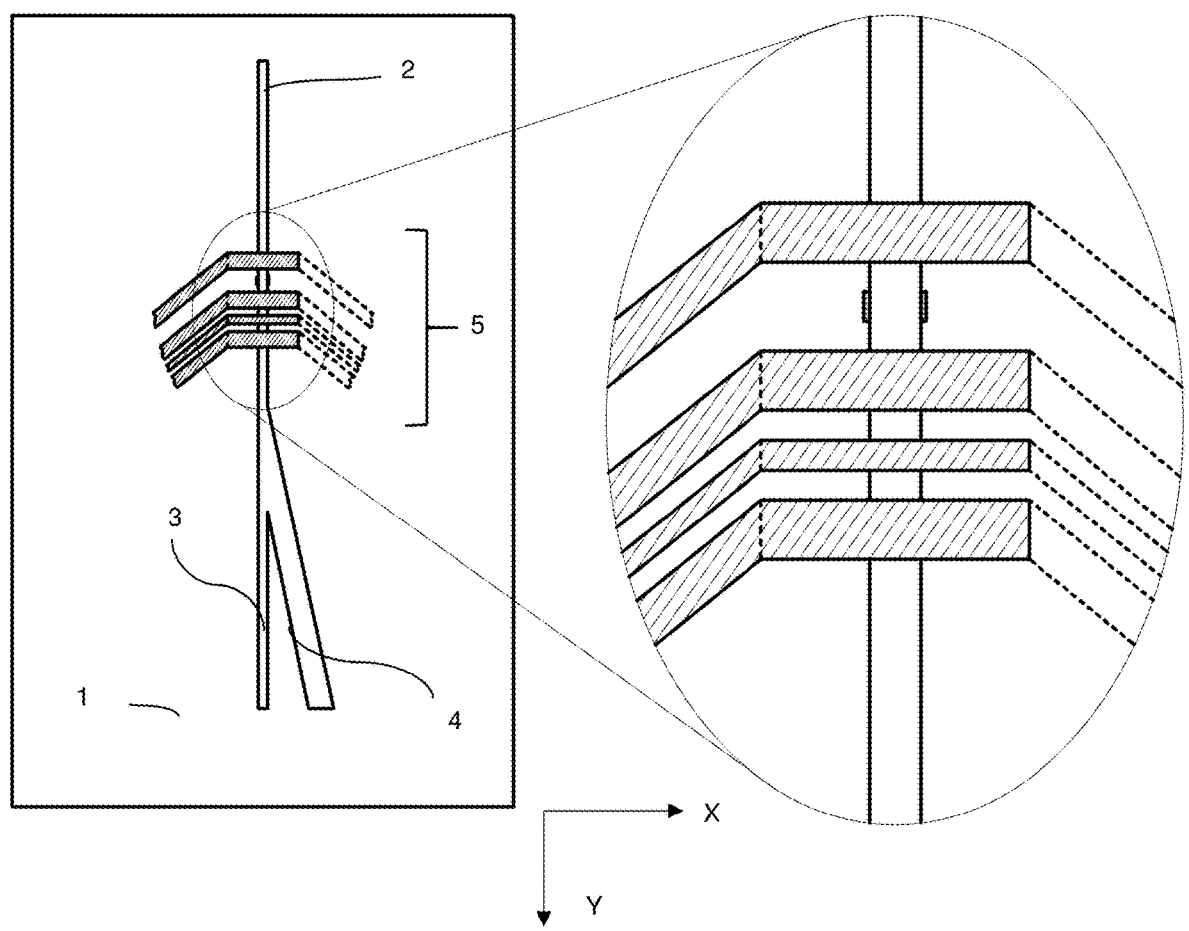
FIG. 4a is a section of an embodiment of a microfluidic chip comprising the common microfluidic channel and the detection area.
Figure 4B:
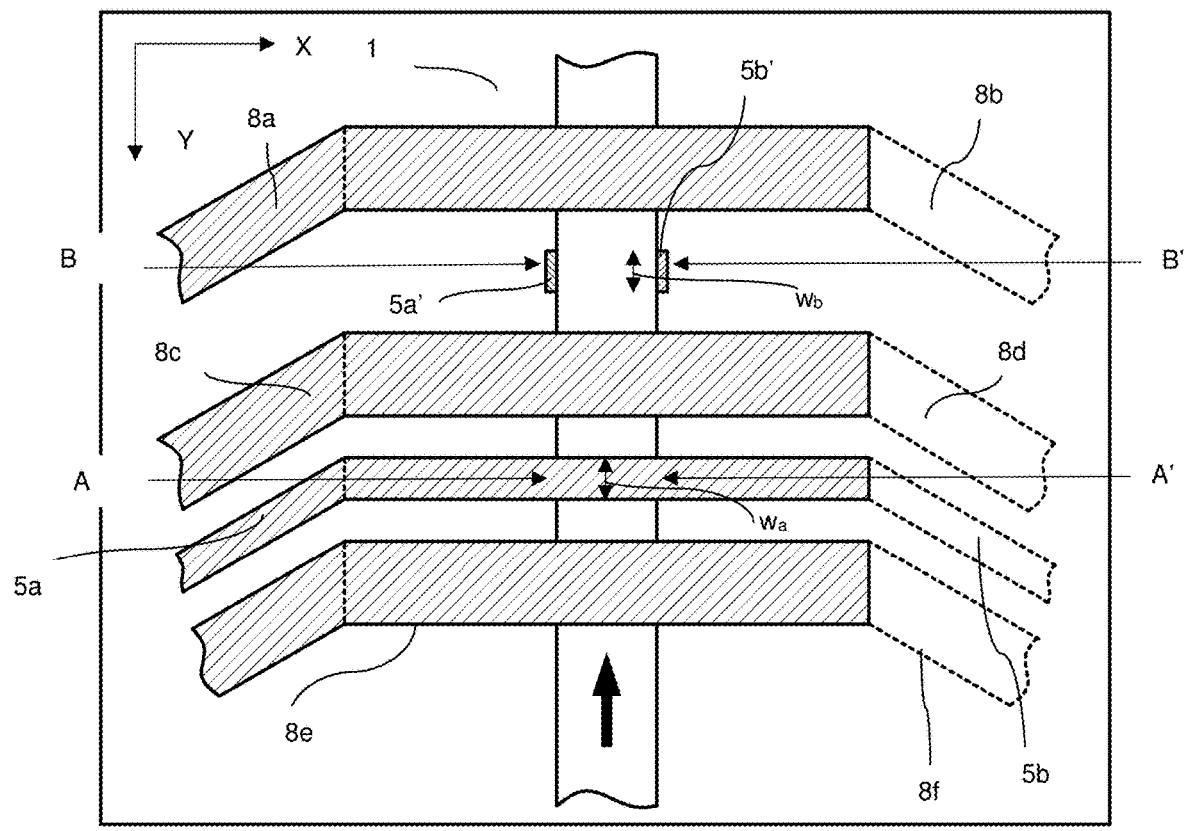

FIG. 4a describes a section of an embodiment of a microfluidic chip 1 comprising the common microfluidic channel 2 and the detection area 5. There can be other optional elements of the microfluidic chip 1 such as area where a number of channels containing sample fluid 3 and the guidance (sheath) fluid 4 merge into the single common channel 2. Again, this arrangement is optional. One may operate microfluidic chip without any sheath fluid, for example by filling the entire cross-section of the microfluidic channel with sample fluid alone. Such embodiment is also covered by the present invention. The optional area where multiple channels, sample channel 3 and guidance microfluidic channel 4, merge into a common microfluidic channel 2, is shown in FIG. 4a. This optional area is located upstream from the detection area. In this embodiment, the common microfluidic channel 2 has a rectangular cross-section with the dimensions in the following range: width w 20 to 3000 micrometres, more preferably 20 to 500 micrometres and the height h in the range of 10 to 3000 micrometres, more preferably 20 to 500 micrometres. To simplify understanding of the invention it is best thinking in terms of a channel with square cross-section. The cross-section of the common microfluidic channel 2 does not need to be square or rectangular, and channels with other cross-sections can also be deployed. Referring to FIG. 4b, showing detailed view of the same embodiment, the detection area 5 is equipped with the detection electrodes 5a, 5b, 5a' and 5b'. In this embodiment there are optional shielding electrodes 8a, 8b, 8c, 8d, 8e, 8f to reduce the noise induced in the detection electrodes and improve signal detection. Such noise is manifested as voltage or current induced in the detection electrodes from various other electrodes of the microfluidic chip and various other sources of noise. The shielding electrodes 8a, 8b, 8c, 8d, 8e, 8f are connected to a fixed potential, e.g. a ground potential. The shielding electrodes are preferably in electric contact with the interior of the common microfluidic channel. One could also device additional shielding electrodes on the microfluidic chip that are not in direct contact with the interior of the microfluidic channel. These mainly serve to shield the signal electrodes from the outside interference and induced voltage and noise and are not shown in the figures.

The detection electrodes 5a, 5b, 5a' and 5b' normally have electric contact with the interior of the common channel but for some embodiments, especially operating at higher end of frequency range, the detection electrodes may also be electrically insulated from the interior of the common microfluidic channel. The detection electrodes 5b and 5b' are connected to the detection circuit. Some detection electrodes are connected to AC voltage or current generators 5a and 5a' and others are connected to the AC voltage or current detectors 5b and 5b'. These detectors are not shown in FIG. 4b. It will be appreciated that some of the detection electrodes 5a and 5a' are connected to excitation AC voltage or current sources even though they can be attributed to the set of detection electrodes; and other detection electrodes 5b and 5b' are connected to AC voltage or current meters/analysers. To differentiate between the two subsets of the detection electrodes, one can refer to the detection electrodes connected to the AC voltage or current generator, the excitation electrodes 5a and 5a'; and the detection electrodes connected to the AC voltage current detector/measurement circuit, the signal electrodes 5b and 5b'. In the embodiment shown in FIG. 4b, there are two excitation electrodes 5a and 5a' and two signal electrodes 5b and 5b'.

The two excitation electrodes and the two signal electrodes are positioned at the opposite sides of the microfluidic channel and are electrically coupled with each other via the fluid contained in the channel. This coupling can be of resistive- or capacitive nature but more generally at AC coupling, it has a combined resistive-capacitive character. In the embodiment of FIG. 4b, the excitation electrodes 5a and 5a' are connected to AC potential. In this embodiment they are connected to two AC voltage sources generating voltage in the range of 0.01-50 V and the frequency of 10 kHz-200 MHz. The frequencies of the two sources energising the excitation electrodes 5a and 5a' could be different or they could also be identical.

Figure 5A:
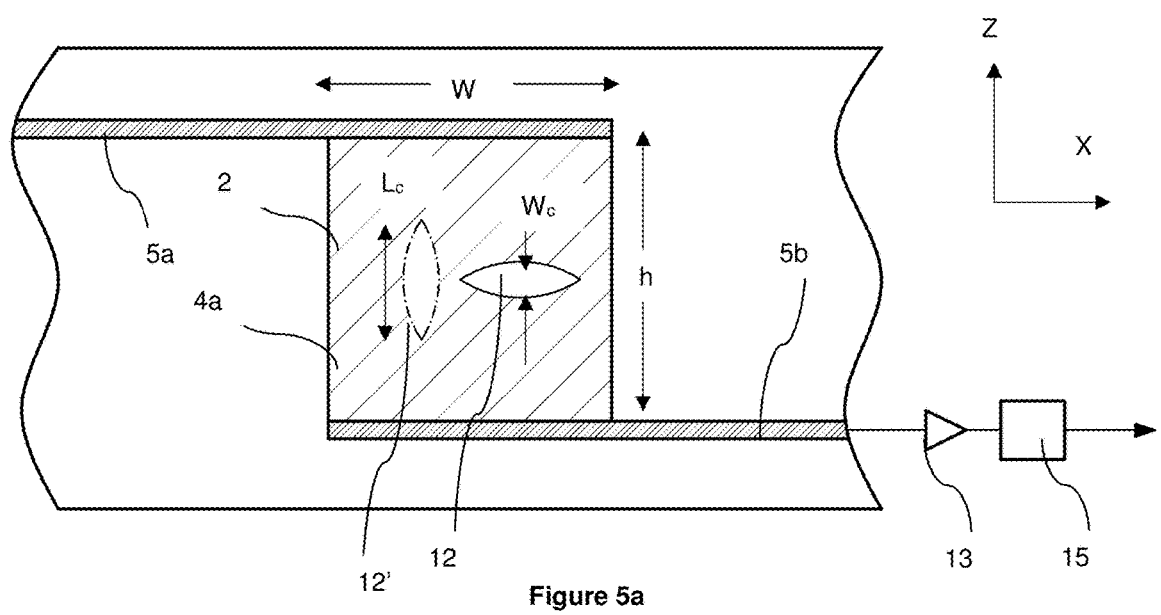
FIG. 5a illustrates cross-sections of FIG. 4b through the line A-A'.
Figure 5B:
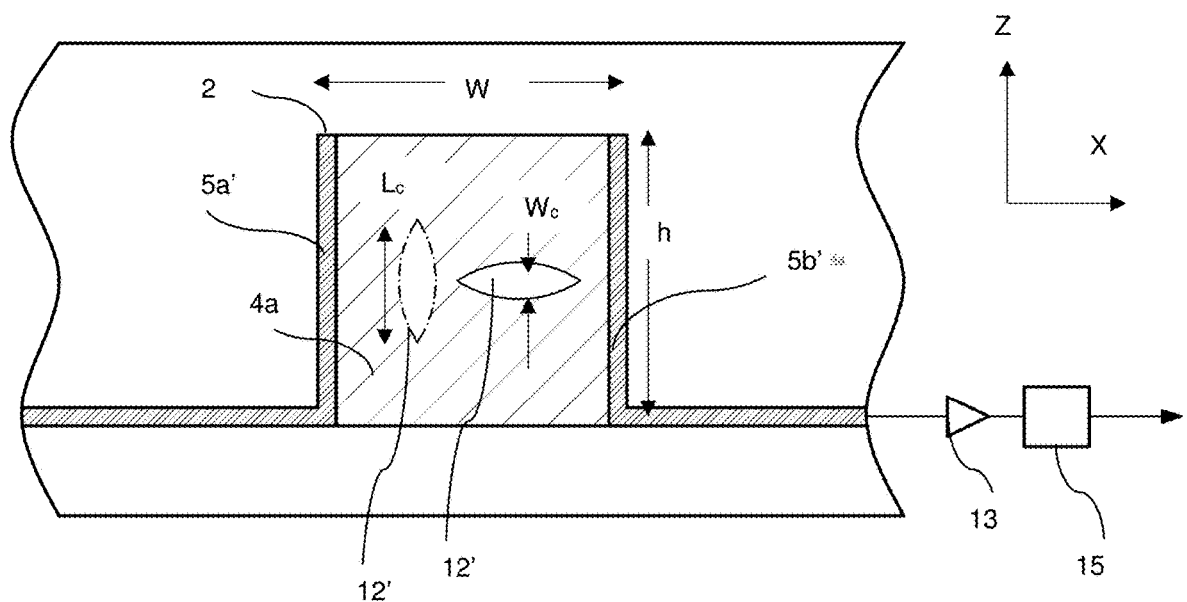
FIG. 5b illustrates cross-sections of FIG. 4b through the line B-B'.

The positions of the electrodes are more clearly shown in FIG. 5a and FIG. 5b that are cross-sections of FIG. 4b through the lines A-A' and B-B' respectively along a vertical plane perpendicular to the flow direction, i.e. in the ZX plane of FIGS. 5a and 5b. The other two detection electrodes, signal electrodes 5b and 5b', are electrically connected to two pre-amplifiers: pre-amplifier 13 and pre-amplifier 13'. These two pre-amplifiers have adjustable gain values and generally these gain values do not have to be equal thus reflecting the differences in the geometry of the two signal electrodes, and their size. In the simplest configuration, the two signal electrodes have identical dimensions, identical areas of contact with the interior of the common microfluidic channel 2, they are positioned at the same distance from the flow of the sample fluid 3a within the cross-section of the microfluidic channel 2, and the gains of the two pre-amplifiers are also identical. The signals from the preamplifiers are sent to ADCs (not shown in FIGS. 5a and 5b), and digitised signals are processed as described in the state of-the-art section using phase-sensitive detector/demodulator/lock-in amplifier.

The detection electrodes 5*b* and 5*b*' detect the change in impedance between them (between the excitation electrode and signal electrode) resulting from the particles/cells passing through the detection area in between the excitation electrode/electrodes and the signal electrode/electrodes. This is described in the state of the art section of the application. To explain the invention the mechanism of the signal formation is described, its qualitative dependency on the properties of the cell and the sample fluid, dependency on the frequency of the voltage connected to the excitation electrode and also on the position and alignment of the cell.

Once a particle/cell passes in between two detection electrodes, it obstructs the electric coupling between the excitation electrode and the signal electrode. This changes the voltage induced in the signal electrode. The amplitude and the phase of the voltage induced in the signal electrodes depend on the properties of particle/cell and therefore can be used as a key indicator in identifying the particle (cell) or the subset to which the particle (cell) belongs. The detection of this signal is done using the method of demodulation with the help of the lock-in or phase sensitive detection as described in the state of the art section. The difficulty arises in the case of anisotropic particles as their orientation with respect to the excitation and the signal electrodes will alter the value of the signal induced. For example the same particle of an anisotropic discoid shape positioned at the same position but with two different orientations, will induce two different values of the signal. FIG. 5*a* shows schematically two discoid shape cells, labelled as cell 12 and cell 12'. The signals from these two cells induced in the signal electrode 5*b*, may be substantially different making the identification of the cells difficult. From our extensive experimental observations, it is found that the signal from the cell 12 positioned with the long axis of the discoid aligned along the x-axis (with labelling as in FIG. 5*a*), the signal will be greater, i.e. it will be greater for the passing cell 12 than for the passing cell 12' alignment, given everything else being equal. Therefore the ability for identifying the particle/cells is compromised by the uncertainty of its orientation. It should be stressed that the size of the cell is disproportionately increased in FIG. 5*a* for clarity of the diagram.

There are ways of improving the alignment of the anisotropic cells/particles and also improving their position within the cross-section of the channel as explained in the description of the state of the art. Clearly, these make positive contribution to the accuracy of the particle/cell measurements but they do not bring complete certainty, especially to the particle/cell alignment. It is clear that any further means of improving information on the position and orientation/alignment of each passing cell/particle could be highly desirable as it would improve the reliability of the identifying the position and orientation/alignment of the cells/particles. The identification of the particle/cell position and alignment should be done in real time within the same time interval as the measurements using the demodulation of the AC impedance change described above.

The invention teaches that in order to negate the uncertainty in the alignment of anisotropic particles, one should measure its AC impedance along two non-collinear directions. This is explained in FIGS. 5*a* and 5*b*. Consider an analysis using the same discoid shape cells. The set of detection electrodes 5*a*' and 5*b*' of FIG. 5*b* results in the maximum signal when the long axis of the discoid of cell 12 is parallel to z axis. It can be established that by measuring two signals V1 and V2 from the electrodes 5*a* and 5*b* (signal V1), and 5*a*' and 5*b*' (signal V2) having identical areas of the contact with the common microfluidic channel 2 as described in relation to FIGS. 5*a* and 5*b*, one could obtain a more representative signal characterising the cell by using the vector sum formula:

$$v=\sqrt{V_1^2+V_2^2}$$

This value V is more representative characteristics of the cell than the individual measurements of the values V1 and V2 as it is less dependent on the alignment of the cell. Here the values V1 and V2 are amplitudes of the signals measured at signal electrodes 5*b* and 5*b*'. It can be explained that in some cases it is also advantageous to use the phase contained in the signals at signal electrodes 5*b* and 5*b*'. Such phase information can also be extracted using phase sensitive detector/lock-in amplifier. For now V1 and V2 can be viewed just as amplitudes of the two signals at signal electrodes 5*b* and 5*b*'.

This formula can be interpreted in terms of vector algebra:

$$\vec{v}=+\vec{V_1}+\vec{V_2}$$

FIGS. 5*a* and 5*b* show common microfluidic channel 2 of a square cross-section. This configuration is the easiest of understand as it ensures that contact areas between the electrodes and the interior of the microfluidic channel (this will be referred to as contact area) are identical for the electrodes of FIG. 5*a* and FIG. 5*b* for the same width of the electrodes ($w_a=w_b$, see FIG. 4*b*). Furthermore, the current density for the FIG. 5*a* is the same as the one for the FIG. 5*b* given the same amplitude of the excitation voltages connected to the excitation electrodes 5*a* and 5*a*'. One could easily achieve the condition of equal contact area of horizontal and vertical electrodes (i.e. electrodes of FIGS. 5*a* and 5*b*) in the situation when the common microfluidic channel 2 has a rectangular cross-section instead of a square one. That is, in the notations of FIG. 5*b*, when w≠h. In this case one needs to make the detection electrodes 5*b* and 5*b*' having different widths: $w_a \neq w_b$. However, this alone may not fully address the issue of different sensitivities of the signal electrodes 5*b* and 5*b*' in the case of rectangular microfluidic channel. Indeed, if the width of the channel w is not equal to its height h, the same amplitude of the excitation voltage applied to the excitation electrodes 5*a* and 5*a*', will produce different values of the current and different values of the electric field in the microfluidic channel even if the contact areas of the detection electrodes 5*b* and 5*b*' with the common microfluidic channel are identical. Furthermore, the change in the impedance due to passing cell will be different as the dimensions of the cell: $W_c$ and $L_c$ form different proportions compared to the width w and the height h of the channel. To compensate for the difference in the w and h for a rectangular channel, one could take two approaches. Firstly one could change the amplitude of the excitation voltage in one set of the electrodes or the value of the gain in one of the pre-amplifiers to compensate for this discrepancy in the width and height of the channel. This would require modelling of impedance change by a cell passing in between the two detection electrodes. The second approach is based on introducing re-calibration constant k in the formula:

$$V=\sqrt{V_1^2+kV_2^2}$$

Clearly this re-calibration could equally be introduced into the first of the two terms, instead of the second one. The letter c is used to indicate such an alternative re-calibration constant:

$$V=\sqrt{cV_1^2+V_2^2}$$

To find the calibration constant empirically, the following procedure is proposed. One should pass a population of identical particles/cells through a microfluidic channel, similar to the one of FIG. 4b. This will produce a scatter of data points on the 2D plane of data points with axes: V1 and V2. One needs to apply the mathematic procedure of transforming the data points according to the formula $$V = \sqrt{V_1^2 + kV_2^2}$$

finding the value of the coefficient k (or c) such that the scatter of the data points is minimised.

With reference to our interpretation of calculating V as the vector sum $$\vec{V} = \vec{V_1} + \vec{V_2}$$

It can be stated that one of the two vectors need to be re-normalised by $k^{1/2}$ $$\vec{V} = \vec{V_1} + \sqrt{k}\vec{V_2}$$

It should emphasise a number of technical points facilitating understanding practicing the invention. These can be interpreted in relation to FIGS. 4a and 4b and FIGS. 5a and 5b and associated figures FIG. 4a shows the top view of the common microfluidic channel 2 with the flow direction being parallel to the plane of the drawing. The flow direction is indicated on the drawing. The chip could also comprise a separation area that is normally located downstream from the detection area 5 where the cells/particles are separated according to their type if such a separation is required. The optional separation area is not shown in FIG. 4a.

As will be appreciated by those skilled in the art of electronics, the supply of the signal from the AC voltage generator into demodulator, lock-in amplifier/phase sensitive detector as frequency reference, is important. This is not shown for clarity of the figures.

In a typical embodiment the width of the excitation and signal electrodes is in the range of 0.05 mm to 50 mm.

In a pair of detection electrodes composed of a signal electrodes and excitation electrode, these two do not have to be identical. If the electrodes are identical, this creates homogeneous electric field across the channel and makes the signal from a cell less sensitive to the position of the cell within the channel.

For many embodiments it is advantageous to have the frequencies of the two AC voltage sources connected to the excitation electrodes 5a and 5a', different. For example these could be equal to ω1 and ω2 respectively. At the same time one should tune in the amplifiers connected to the signal electrodes 1 and 2 to these two frequencies. For example, the two amplifiers could be lock-in amplifiers, or phase sensitive detectors. In this case the two amplifiers connected to the signal electrodes 5b and 5b' need to be demodulated at the frequencies ω1 and ω2 respectively. Using two different excitation frequencies can improve the selective signal detections: the signal electrode 5b is tuned to the excitation electrode 5a and not sensitive to the excitation electrode 5a' and vice versa.

At this point it should be noted the frequency of the voltage source/sources. The signal induced in the signal electrodes by cells/particles passing in front of the electrodes is due to conductance change in the space between the excitation and sensing electrodes and also due to permittivity change in the same space. It should be appreciated that the dielectric permittivity ε(f) of a typical cell is frequency f dependent, and its conductance properties are also frequency dependent. These properties may also depend on other external factors such as pH liquid or temperature as the internal properties of the cells are affected by the conditions outside the cell. The conductance of the liquid bi-layer along the cell surface also depends on the pH of the liquid carrying the cells and its internal structure. It is preferable to choose the AC frequency f of the voltage energising the excitation electrodes such that the dielectric permittivity ε at this frequency is significantly different from that of the liquid where the cells are placed. The dielectric permittivity is a complex function that has two components: the real Re ε(f) and imaginary Im ε(f) ones, both of these being functions of frequency. The same applies to conductance. It is preferable to operate the excitation electrodes at the frequency where there is significant difference between the conductance of the particles/cells and that of the liquid carrying these. Such a difference is responsible for the magnitude of the signal induced in the signal electrodes. Since cells have internal fine structure with elements of the structure having their own different dependencies of permittivity, there is generally a rather broad window of frequencies where the signal from the cells/particles can be readily detected. The frequency ω is usually selected in such a window by tuning the frequency to optimise the value of the signal induced in the signal electrodes.

Figure 6:
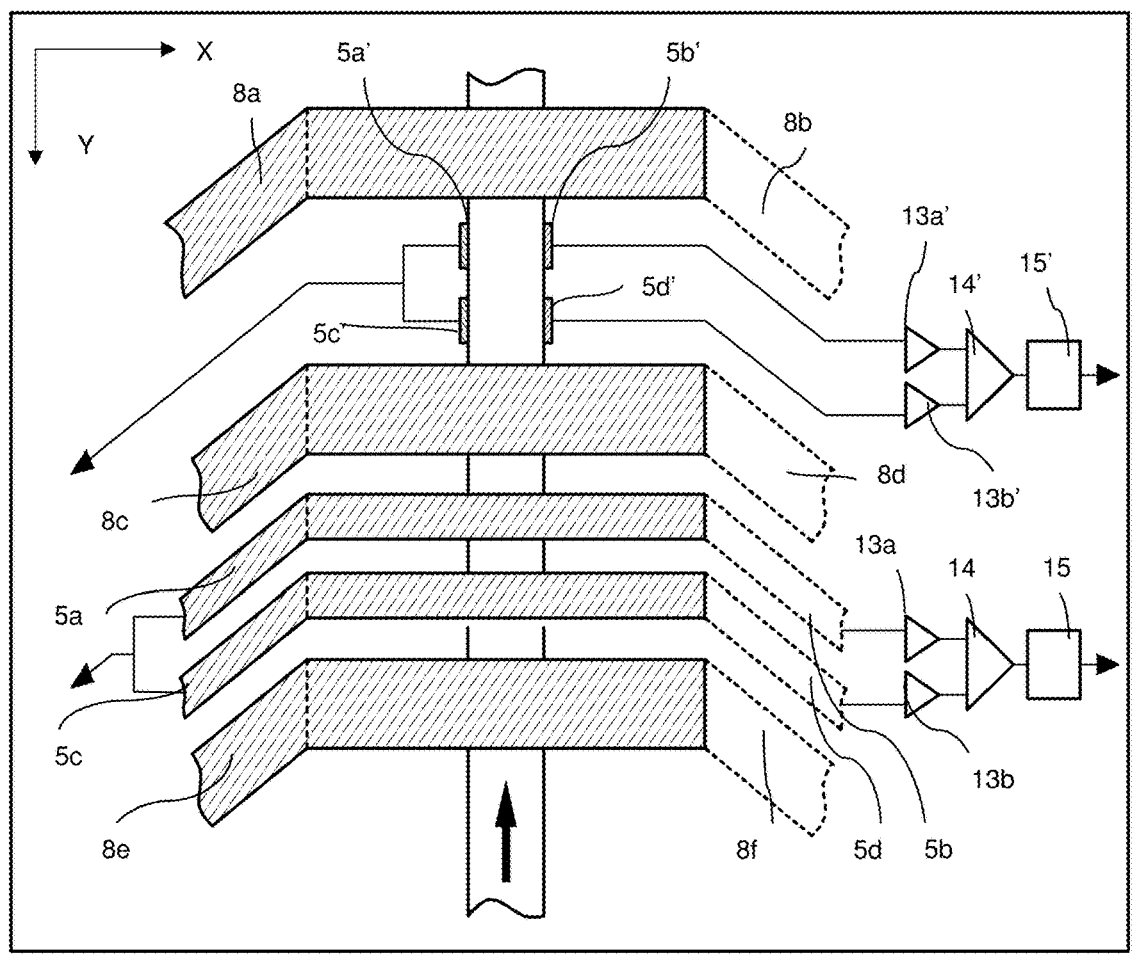
FIG. 6 illustrates an embodiment of a microfluidic chip with two detection electrodes producing field along the X axis and four detection electrodes producing field along the Z axis.

In order to improve signal-to-noise ratio of the individual components V1 and V2, it is beneficial to use differential amplifiers. For this, the signal electrodes 5b and 5b' are each replaced by two electrodes: signal electrode 5b is replaced for signal electrodes 5b and 5d and signal electrode 5b' is replaced for electrodes 5'b and 5d' respectively. These are connected to two inputs of pre-amplifiers, pre-amplifiers 13a, 13b, 13a' and 13b'. The outputs of the pre-amplifiers are connected to a comparator/differential amplifier 14 and 14' as shown in FIG. 6. The excitation electrodes 5a and 5a' are also separated into two electrodes each and these are positioned opposite its own signal electrode (excitation electrodes 5a, 5a', 5c, 5c' are opposite signal electrodes 5b, 5b', 5d, 5d'). In this case the signals from the pre-amplifiers 13a and 13b are introduced as inputs into the differential amplifier/comparator 14 and the signals from the pre-amplifiers 13a' and 13b' are introduced as inputs into the differential amplifier/comparator 14'. The outputs from the two pre-amplifiers are digitised by analogue-to-digital converters ADC 15 and ADC 15' respectively.

The comparators/differential amplifiers 14 and 14' amplify the difference between two inputs. The comparators 14 and 14' are connected to lock-in amplifiers or demodulator/phase sensitive detectors capable of measuring the signals at the frequency ω of the AC voltage source connected to the excitation electrodes. Consider the operation by referring to one pair of excitation electrodes (5a and 5c) and one pair of signal electrodes (5b and 5d). In the absence of any particles/cells in the microfluidic channel, the output from the comparator is set to zero if the outputs of the pre-amplifiers 13a and 13b are set accurately to compensate each other.

Figure 7:
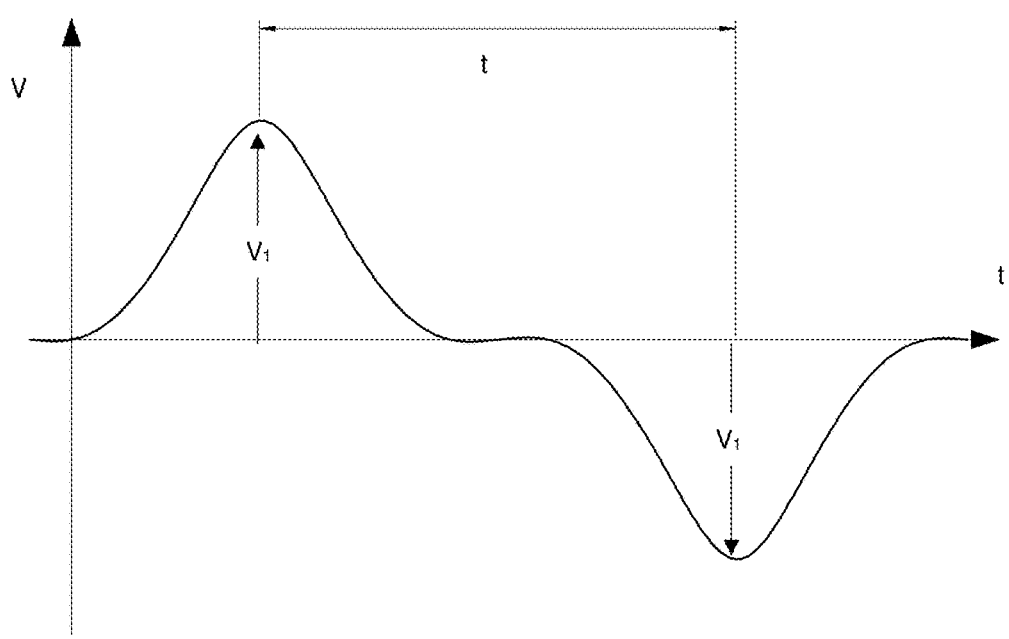
FIG. 7 illustrates schematics of a signal induced by a passing cell in the first four detection electrodes of FIG. 6.

Once the particle, cell passes in between the excitation electrode and the signal electrode, it will induce signal in the comparator at the frequency ω of the generator connected to the excitation electrodes. The typical amplitude of the output signal from the comparator is shown in FIG. 7. The signal will appear as a wave of one polarity followed by the wave of the opposite polarity and the same magnitude. This shape of the signal is due to the cell/particle passing first in front of the signal electrode 5d connected to the pre-amplifier 13b and inducing signal of amplitude e.g. V1 that is introduced into the comparator 14 with the positive polarity and then passing in front of the second signal electrode 5*b* connected to the pre-amplifier 13*a* inducing rather the same signal V1 that is introduced into the comparator 14 with a negative polarity. The time delay t between the first hump (peak) and the second one is indicative of the flow velocity in the channel as it is equal to the time required for the same cell/particle to travel from the position in front of the first sensing electrode 5*d* to the same position in front of the second one 5*b*. The detection of this signal is done using the method of demodulation with the help of the lock-in or phase-sensitive detection as described in the state of the art section of this document. The amplitude and the phase of the signal V1 are indicative of the characteristics of the particle (cell) and therefore can be used as a key indicator in identifying the particle (cell) or the subset to which the particle (cell) belongs. As described earlier, the excitation electrodes 5*a* and 5*c* could be excited at a different frequency to the one of the excitation electrodes 5*a*' and 5*c*'. FIG. 6 does not clearly show the difference between the excitation electrodes 5*a* and 5*c* on one hand and the signal electrodes 5*b* and 5*d* on the other hand. The excitation electrodes and the signal electrodes have the same size and positioned one underneath the other and therefore are not distinguishable on a top view FIG. 6. Clearly in the same way as in FIGS. 5*a* and 5*b*, the excitation electrodes and the signal electrodes are positioned on opposite walls of a microfluidic channel facing each other. It should be stressed that that this is merely shown as example. The excitation electrodes and the signal electrodes do not need to be of the same size or of the same area of contact with the microfluidic channel.

Figure 8:
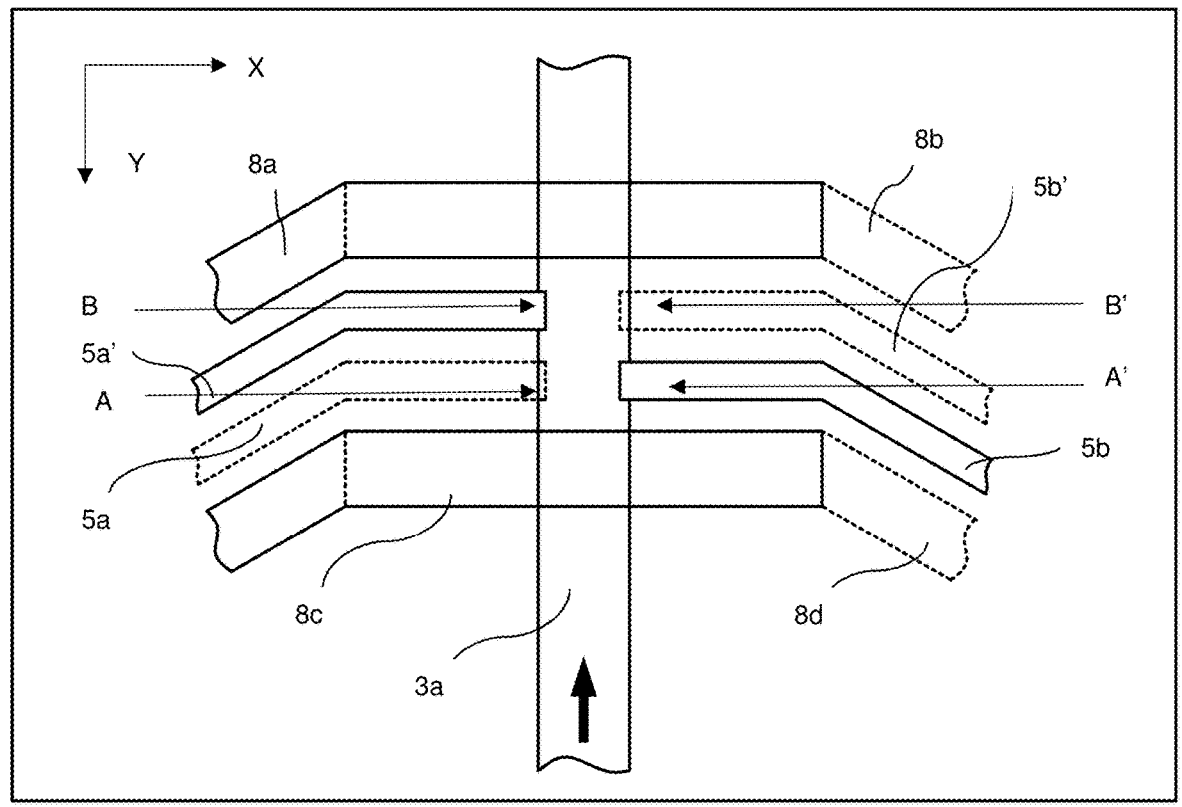
FIG. 8 illustrates a top view of microfluidic chip having two excitation electrodes and two signal electrodes producing two electric fields nearly along the two diagonals of the microfluidic channel.
Figure 9A:
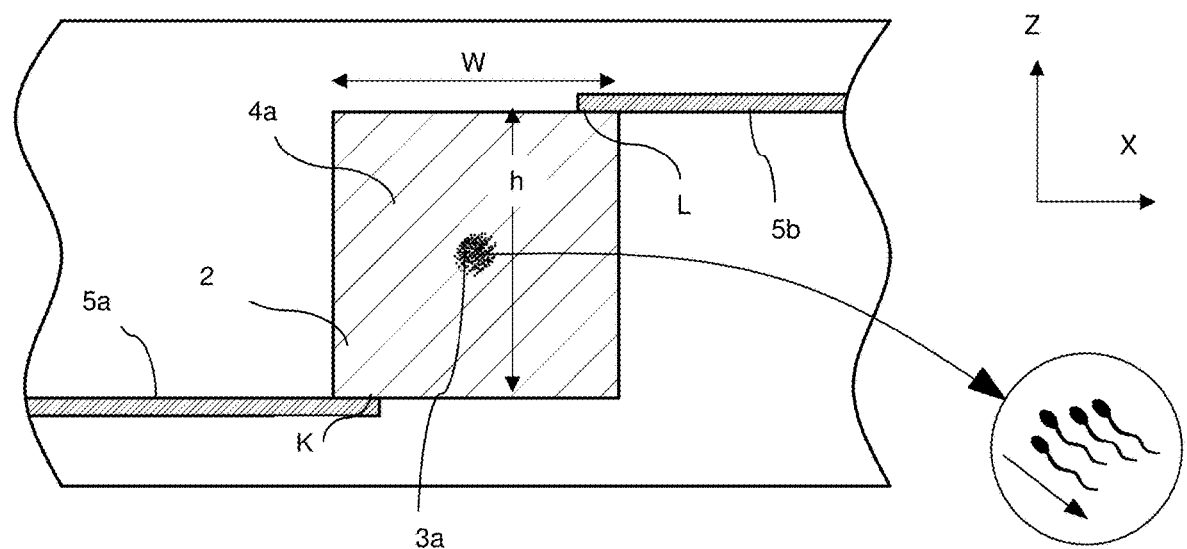
FIGS. 9a and 9a illustrates cross-sections along the Y axis through the lines A-A' and B-B' of FIG. 8 respectively.
Figure 9B:
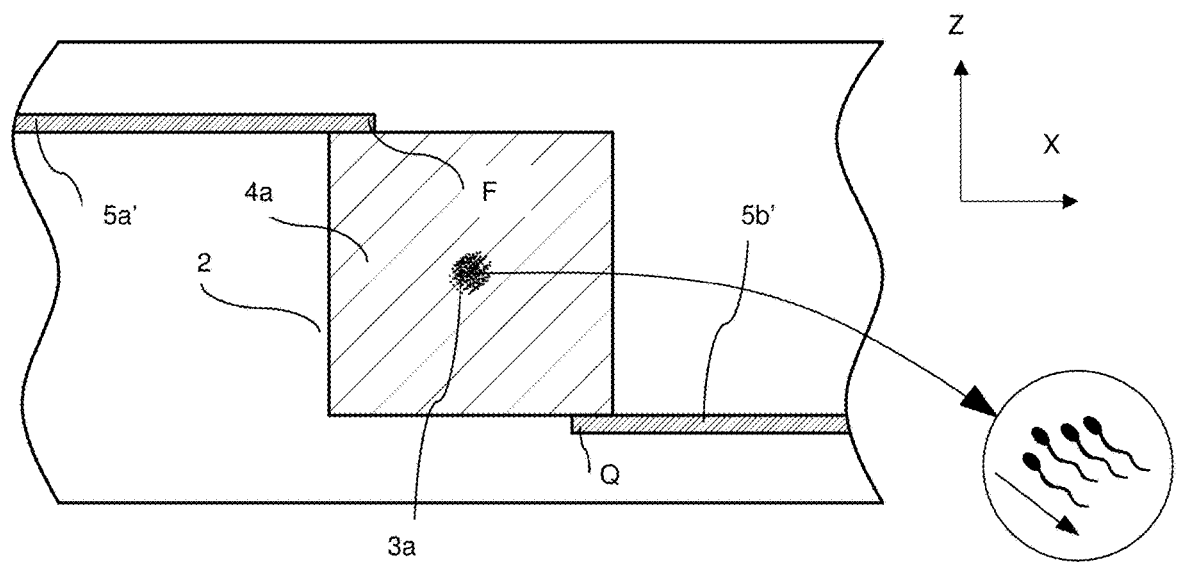

FIG. 8 shows top view another microfluidic chip having two excitation electrodes 5*a* and 5*a*' and two signal electrodes 5*b* and 5*b*'. The flow direction is indicated by a bold arrow, like in other figures of this document. The positions of the electrodes along the top and bottom walls of the channel are shown in FIGS. 9*a* and 9*b*. FIG. 9*a* shows cross section through the embodiment of FIG. 8 along the line AA' in the plane ZX and the FIG. 9*b* shows cross-section along the line BB' of FIG. 8 in the same plane ZX. In this embodiment the cells are flowing along the centre of the common microfluidic channel 2 cross-section. In FIGS. 8, 9*a* and 9*b* this is drawn as sample fluid 3*a*. The flow of sample fluid 3*a* is kept at the centre of the microfluidic channel 2 by means of hydrodynamic focusing. The first set of detection electrodes 5*a* and 5*b* creates electric field along the line KL (FIG. 9*a*) at the centre of the channel and the second set of detection electrodes 5*a*' and 5*b*' creates electric field along the line FQ (FIG. 9*b*) at the centre of the channel. Such a field is created by the configuration of the electrodes that make contacts with the interior of the common microfluidic channel 2 only along the near corner areas of its squared cross-section. Unlike in FIGS. 5*a* and 5*b*, the field is not homogeneous in the embodiment of FIGS. 8, 9*a*, 9*b*.

In the configuration of the FIG. 9*a*, the signal on the detection electrodes 5*b* is greater if the discoid cell has short axis aligned along the direction marked by the letters KL. As the value of the signal detected by the detection electrodes 5*b* is not only dependent on the type of the cell but also on its position and the alignment, it is crucial to achieve as uniform as possible a positioning and alignment of the cells (particles) with respect to the detection electrodes. This is necessary for more reliable differentiation between different types of cells (particles) that is important for identification of different cell populations and also for the separation of different sub-populations of cells (particles). More homogeneous alignment of all the cells with respect to the detection electrodes reduces the spread of the values of the signals detected by the signal electrodes resulting from the single cells passing in between the detection electrodes. If such a uniform alignment of cells/particles is not possible or if the identical positioning of the cells/particles in front of the detection electrodes is not possible, one could benefit from additional information indicating cell positioning and alignment. As the field direction of the next pair of collection electrodes marked by the letters FQ on FIG. 9*b* is nearly orthogonal to the line KL of FIG. 6*a*, the signal between the excitation electrode 5*a*' and the signal electrode 5*b*' is maximised when the short axis of the discoid cell is parallel to FQ. Therefore, a particle/cell positioned for the maximised signal for the signal electrode 5*b* and excitation electrode 5*a*, corresponds to the smallest signal detected by the excitation electrode 5*a*' and signal electrode 5*b*' and vice versa. In order to reduce the error associated with the alignment of the cell the invention teaches to calculate the same sum.

$$V=\sqrt{V_1^2+V_2^2}$$

The present invention teaches that this value is a more representative characteristics of the cell than the individual measurements of the values V1 and V2 as it is less dependent on the alignment of the cell.

In the same way as described in relation to embodiment of FIG. 6, the electrodes at the near corner positions of square cross-section of the common channel 2 could also be divided into two each: two excitation electrodes 5*a* and 5*c*, and two signal electrodes facing them 5*b* and 5*d*. These produce electric field along the line KL (FIG. 9*a*). This is followed by the two excitation electrodes 5*a*' and 5*c*' facing two signal electrodes 5*b*' and 5*d*'. These produce electric field along the line FQ (FIG. 9*b*). The pre-amplifiers connected to signal electrodes 5*b*, 5*d* and 5*b*', 5*d*', are not shown as well as the comparators/differential amplifiers.

If the directions of the two electric fields are not orthogonal to each other but rather make angle θ with each other, one should calculate the following expression:

$$\sqrt{V_1^2+V_2^2+2V_1V_2\cos\theta}$$

Figure 10A:
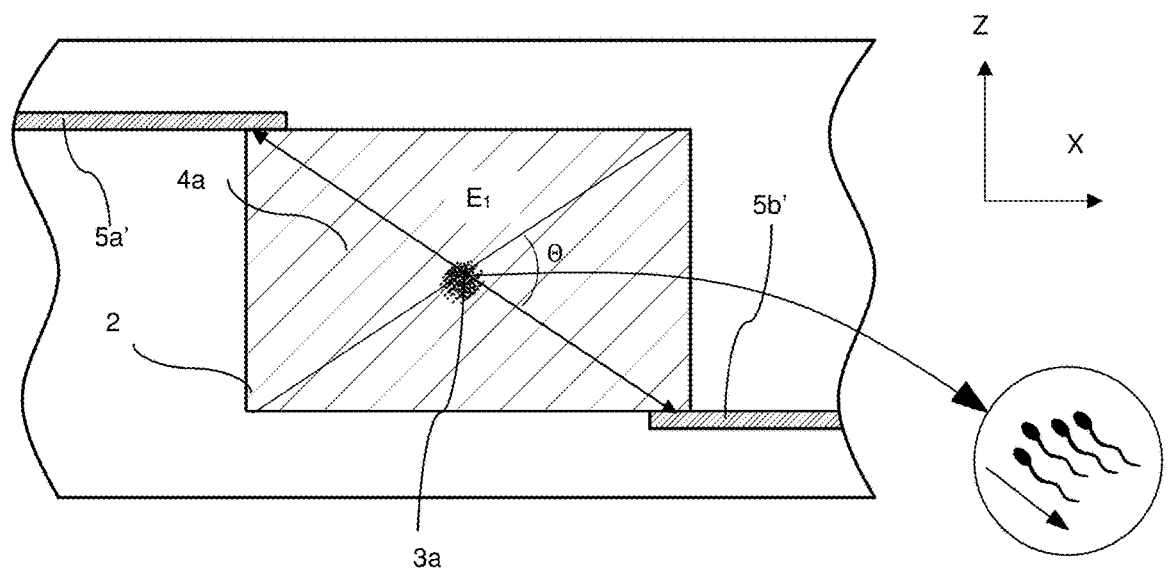
FIGS. 10a and 10b illustrates cross-sections along the Y axis (perpendicular to the flow direction) for another embodiment of the microfluidic chip where the two directions of the field at two sets of detection electrodes are aligned at angle θ to each other.
Figure 10B:
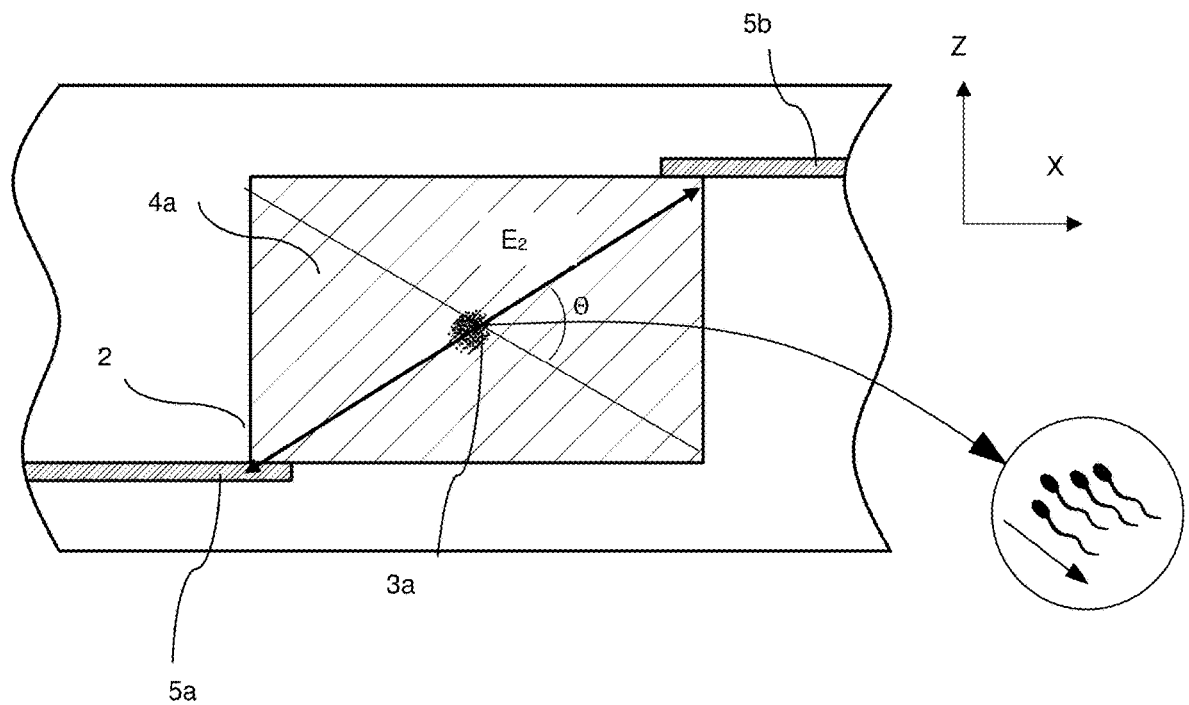

Such and alignment is presented in FIGS. 10*a* and 10*b* showing common microfluidic channel of a rectangular rather than square cross-section. The angle between the electric fields of the two sets of detection electrodes is θ.

At this point it is important emphasise that the signal received at each signal electrode in general are complex signals. They are characterised by amplitude and phase or otherwise by real and imaginary parts of the signal. As explained earlier that such complex response arises from a complex circuit in between the excitation and the signal electrode: there is resistive and capacitive coupling between the electrodes. The cells are also characterised by a dielectric constant that has real and imaginary parts. The real part is responsible for the losses in the cell under the influence of the AC electric field. The liquid carrying particles/cells also has real and imaginary dielectric constant. For a given configuration of the electrodes and given characteristic of the liquid and the particles/cells, the importance of the phase contained in the signal is dependent on the excitation frequency ω. There can be a window of frequencies where the phase characteristics of the signal collected from the signal electrode should not be neglected as it contains valuable information helping to identify the particles/cells. This information can be readily collected if the signal detection is done using phase-sensitive detector or lock-in amplifier. In this case it is necessary to expand the meaning of formula for the addition of complex vectors to include complex vectors:

$$\vec{V}=\vec{V}_1+\vec{V}_2$$

where the individual components $\vec{V}_1$, $\vec{V}_2$ and $\vec{V}$ are complex vectors with real in imaginary components. The results thus obtained should also be presented in 2D format: the obtained vector sum V is a complex vector and each data point needs to be presented e.g. along the axes of a real and imaginary parts of V or along the axes of amplitude of V and its phase. Such 2D representation of information is most complete and facilitates most robust identification of particles/cells. Therefore each passing particle/cell is characterised not just by a single number (amplitude of the signal at the signal electrode) but by two numbers: the amplitude and the phase of the signal detected at the signal electrodes (this is equivalent to detecting real and imaginary parts of the signal). This is very much the same as the current approach used in AC impedance detection: each particle/cell is characterised by a complex signal composed of amplitude and phase (or by real and imaginary parts of the signal). This is readily appreciated by those skilled in AC impedance detection of cells in microfluidic channels.

Figure 11A:
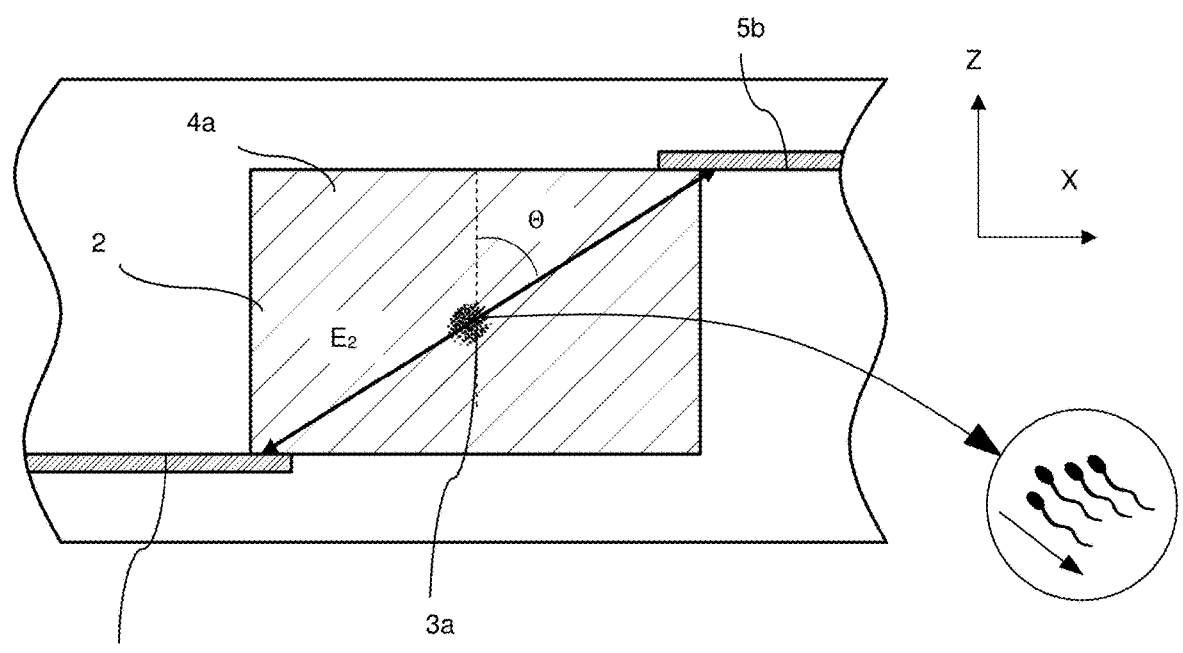

One could form electrodes over the entire width of the channel and yet establish electric contact over a smaller window of these. This is shown in FIGS. 11a and 11b. The two detection electrodes 5a' and 5b' shown in FIG. 11b (or four detection electrodes in the case of measurements with differential amplifier) are made using a dielectric layer 7a and 7b. The electric contact with the interior of the common microfluidic channel 2 is made at two opening windows in the dielectric layer marked by letters KK' and NN'. The other set of detection electrodes 5a and 5b (FIG. 11a) is formed in the same way as in FIGS. 10a and 10b, at the corners of the rectangular cross-section of the microfluidic channel. The angle θ between electric fields generated by two sets of electrodes is shown in FIG. 11a and FIG. 11b.

As hydrodynamic focusing is referred to, it is timely to discuss that microfluidic chip is only a part of the microfluidic device. The microfluidic device also includes means for sustaining and control of the fluid flow in the microfluidic channel, mixing the flows of the sample fluid and the sheath fluid, regulating the flows. The flow of fluids in the channels is sustained by a pump or multiple pumps or a pressure source/sources. This could be e.g. one or several pressure driven UniGo pumps from Cellix Limited, Dublin, Ireland. The pump/pumps are not shown in figures of this document for shortness as those skilled in the art of microfluidics are familiar with this aspect. There is a flow of the particles containing fluid 3a enveloped in the flow of the guidance/sheath fluid 4a. For shortness, the particles-containing fluid may also be called the sample fluid. These two terms may be used interchangeably and can also be referred to it as the liquid carrying particles/c. Therefore it is understood that the liquid carrying particles/cells and the particles/cells themselves form sample fluid. For example, this could be TRIS A buffer which is commonly used in handling sperm cells in the flow. The particle containing fluid is the fluid that contains the particles of interest. These could be organic or inorganic particles. These could also be alive or dead cells including mammalian cells, sperm cells, yeast cells, particles of biological and non-biological origin etc. In this embodiment the particles-containing fluid stream (sample fluid) is located at the centre of the guidance fluid 4a flow, i.e. at the centre of the cross-section of the common microfluidic channel 2. Therefore, the guidance fluid 4a performs the function of the sheath fluid focusing the flow of the particle containing fluid into a tighter flow of reduced cross-section. One can construct other embodiments where the sample fluid is guided by the guidance fluid to be positioned not at the centre of the common microfluidic channel but e.g. at a corner of rectangular cross-section of the common microfluidic channel or along its wall. The guidance fluid also does not need to envelope the sample fluid all around but could envelope it e.g. on two or three sides. All these embodiments are included with respect to the description and figures. To obtain the focusing of the particles-containing fluid 3a by means of the guidance fluid, the microfluidic chip 1) comprises sample microfluidic channel 3 sustaining a flow of particles containing fluid and a guidance microfluidic channel or channels 4 sustaining a flow of guidance (sheath) fluid. The two channels merge forming the common microfluidic channel 2 so that the sample microfluidic channel 3 is coupled to the centre of the guidance microfluidic channel 4 to obtain the position of the sample fluid as shown in FIGS. 9a and 9b. Typically the flow rate of the guidance fluid is substantially greater than the flow rate of the sample fluid, i.e. greater by a factor of 2 to 100.

It will be appreciated by those familiar with hydrodynamic focusing that there is no sharp physical boundary between the sample fluid flow 3a and the guidance fluid 4a in the common channel 2. These two liquids gradually intermix by diffusion and under influence of other forces, along the common microfluidic channel as they move from the point of their mergence downstream. However, over the distance of 100-1000 micrometers one could readily consider the flow as the flow of two fluids: the sample fluid enveloped by a guidance fluid. The guidance fluid 4a may also be called the sheath fluid in this document. Those skilled in the art appreciate that the linear velocity varies strongly across the channel and normally is greatest at the centre of the channel at least for pressure-driven flows. This compression of the sample fluid by the sheath fluid through the laminar mixing of the streams in a single common microfluidic channel, is known as hydrodynamic focusing. The focused flow of the particles containing fluid gradually becomes defocussed due to the diffusive movement of the particles perpendicular to the flow direction. If the hydrodynamic focusing is used, the detection area described in FIG. 4a is located at short enough distance away from the point where the sample microfluidic channel merge with the guidance channels, at such a distance where the particles-containing fluid still remains focused at the centre of the common microfluidic channel 2. This distance could be in the range 50 to 500 micrometers.

All the discussion so far and all the embodiments dealt with the misalignment of the cells in the plane perpendicular to the flow direction. This improves the accuracy of the particles/cells identification compared to one measurement along a single direction perpendicular to the flow direction. However, the particles/cells could also be misaligned along the third axis that is along the axis of the channel.

Figure 12:
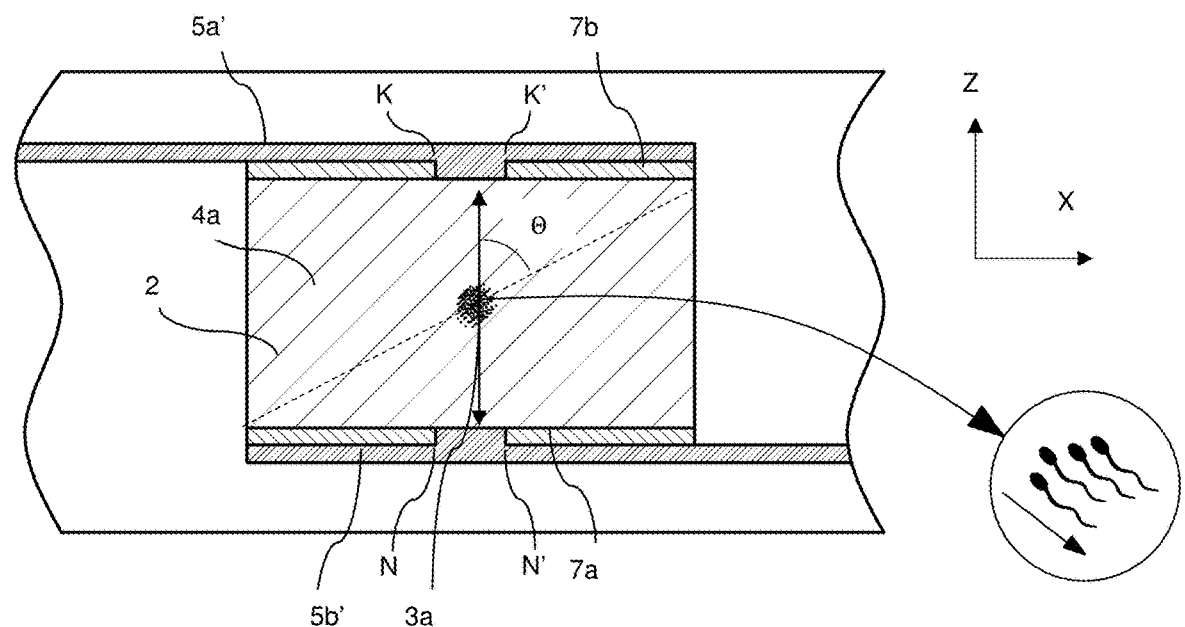
FIG. 12 illustrates a cross-section of another embodiment of a microfluidic chip with four detection electrodes producing field along the Z axis.
Figure 12:
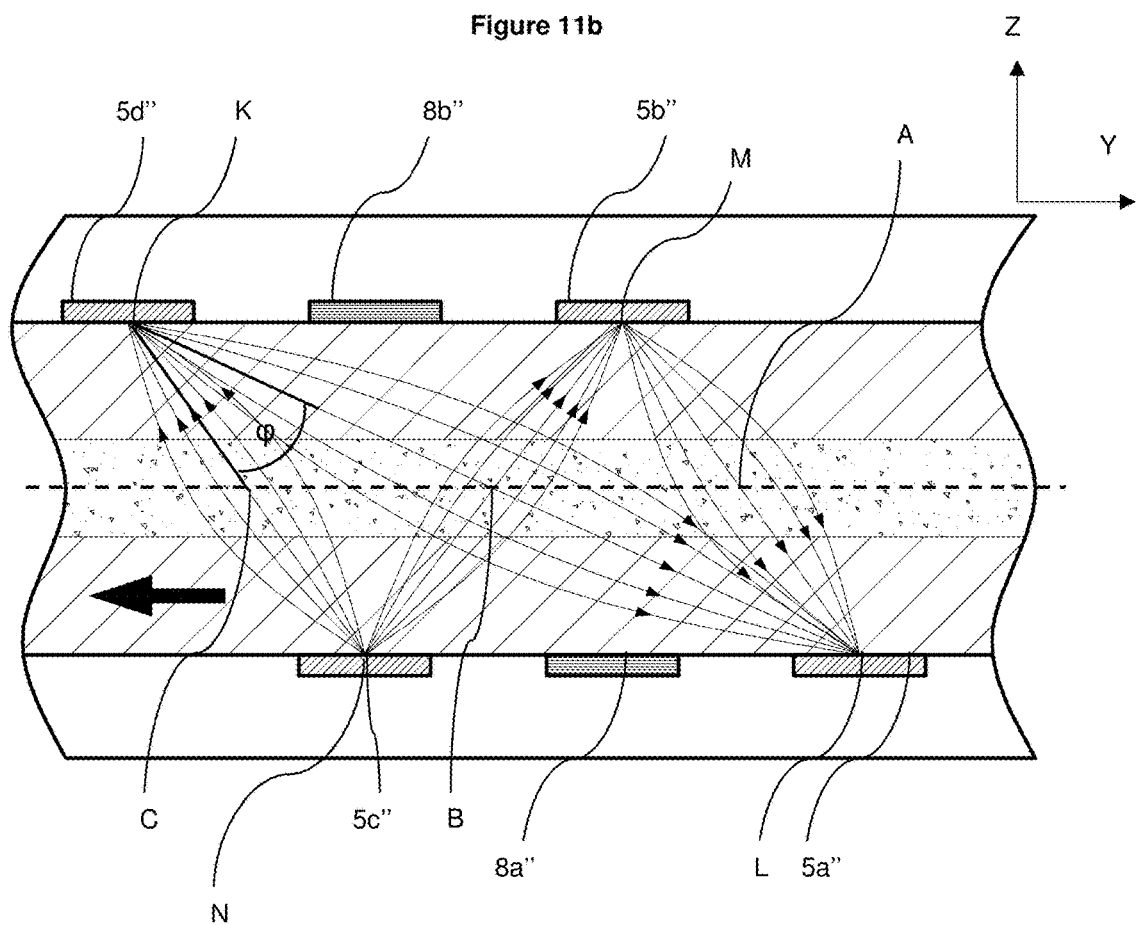
Figure 13:
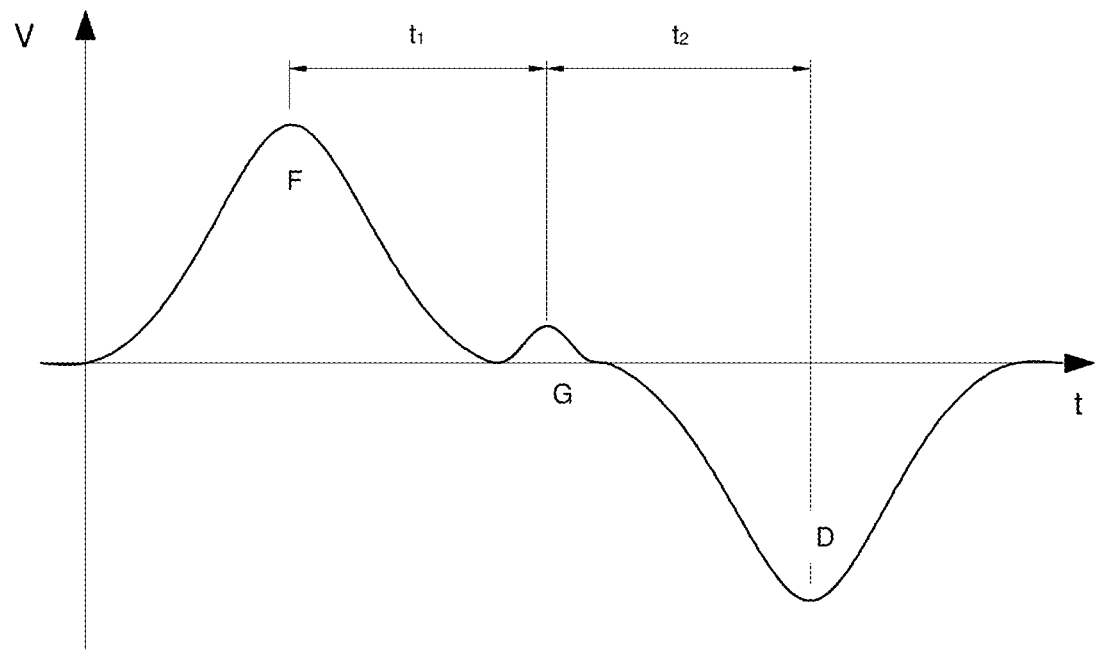
FIG. 13 illustrates a schematic of a demodulated signal induced by cell flowing passed points A, B and C in FIG. 12.

It is desirable to add a third component to the vector sum in order to account for misalignment of particles/cells in full 3D space. This requires addition of the third set of detection electrodes. The fields produced by all the three sets of detection electrodes should not be collinear. The third set of electrodes is shown in FIG. 12. There are two excitation electrodes, 5a" and 5c", and two signal electrodes, 5b" and 5d". The two excitation electrodes 5a" and 5c" could be connected to a single AC voltage/current source. This may have the same frequency as AC voltage sources connected to the excitation electrodes 5a and 5a' described earlier. The excitation electrodes 5a" and 5c" could also be connected to an AC source of a different frequency than the one of the excitation electrodes 5a and 5a'. Furthermore, the excitation electrodes 5a" and 5c" could be connected to AC sources of two different frequencies. The detection electrodes 5b" and 5d" are connected to their own pre-amplifiers and then to comparator/differential amplifier as described in relation to FIG. 9. These are not shown in FIG. 12 to avoid repetition. To understand the signal induced in the comparator/differential amplifier, let us consider a single cell moving in the middle of the microfluidic channel in the stream of sample fluid positioned at the centre of the channel. When the particle/cell crosses the lines marked by points ML and NM, it will induce the signal of certain polarity via the signal electrode 5b". When the particle/cell crosses the lines marked by points NK and KL, it will induce the signal of the opposite polarity via the signal electrode 5d". The typical form of the signal is shown in FIG. 13. The time interval t1 is the time required for the particle/cell to travel from point A to point B (FIG. 12) and the time interval t2 is the time required for the particle/cell to travel from point B to point C (FIG. 12). As the processing of the signals is done by digital processors, it is quite easy to disregard the middle peak marked by the letter G in FIG. 13 and focus analysis on the peaks F and D that contain information on the passing particle/cell in the same way as signals form signal electrodes 5b" and 5d" as described in relation to the previous figures. To suppress the unwanted signal marked by the letter G in FIG. 13, one could position optional shielding electrodes as shown in FIG. 12.

Instead of using two excitation electrodes 5a" and 5c" and two signal electrodes 5b" and 5d", one could device an embodiment with one signal electrode and one excitation electrode in the same way as described in relation to FIGS. 4, 5a, 5b. These details are secondary.

The key point is that FIG. 12 shows the formation of the third set of detection electrodes that create AC electric field that is not collinear with the electric fields of the detection electrodes 5b" and 5d", the latter two are perpendicular to the flow direction. The angle between the direction of AC field of this third set of detection electrodes and the sets 1 and 2, φ, is labelled in FIG. 12.

The signal from the third set of detection electrodes can be used in the same way as described earlier: with the help of expression for the vector sum $$\vec{V} = \vec{V_1} + \vec{V_2} + \vec{V_3}$$

$$V = \sqrt{V_1^2 + V_2^2 + V_3^2 + 2V_1V_2\cos\theta + 2V_1V_3\cos\varphi + 2V_2V_3\cos\varphi}$$

This expression is written for the practical case when the angle between the field of the third set of detection electrodes and the first one is φ, likewise the angle between the field of the third set of detection electrodes and the second one is also φ and the angle between the field of the first and the second sets of detection electrodes is θ, consistent with the discussion of FIG. 12.

In the most general case the expression is $$V = \sqrt{V_1^2 + V_2^2 + V_3^2 + 2V_1V_2\cos\varphi_{12} + 2V_1V_3\cos\varphi_{13} + 2V_2V_3\cos\varphi_{23}}$$

where the angle $\varphi_{ij}$ stands for the angle between the fields of electrodes with indexes i and j.

One can also introduce re-calibration coefficient for this third set of electrodes in the same way and following the same algorithm described in relation to the situation with re-calibration for two sets of detection electrodes $$\vec{V} = \vec{V_1} + \sqrt{k_2}\,\vec{V_2} + \sqrt{k_3}\,\vec{V_3}$$

$$V = \sqrt{\begin{array}{c} V_1^2 + V_2^2 k_2 + V_3^2 k_3 + 2V_1V_2\sqrt{k_2}\cos\theta + \\ 2V_1V_3\sqrt{k_2}\cos\varphi + 2V_2V_3\sqrt{k_2 k_3}\cos\varphi \end{array}}$$

The latter expression is written for the case of embodiment shown in FIG. 12.

Figure 14:
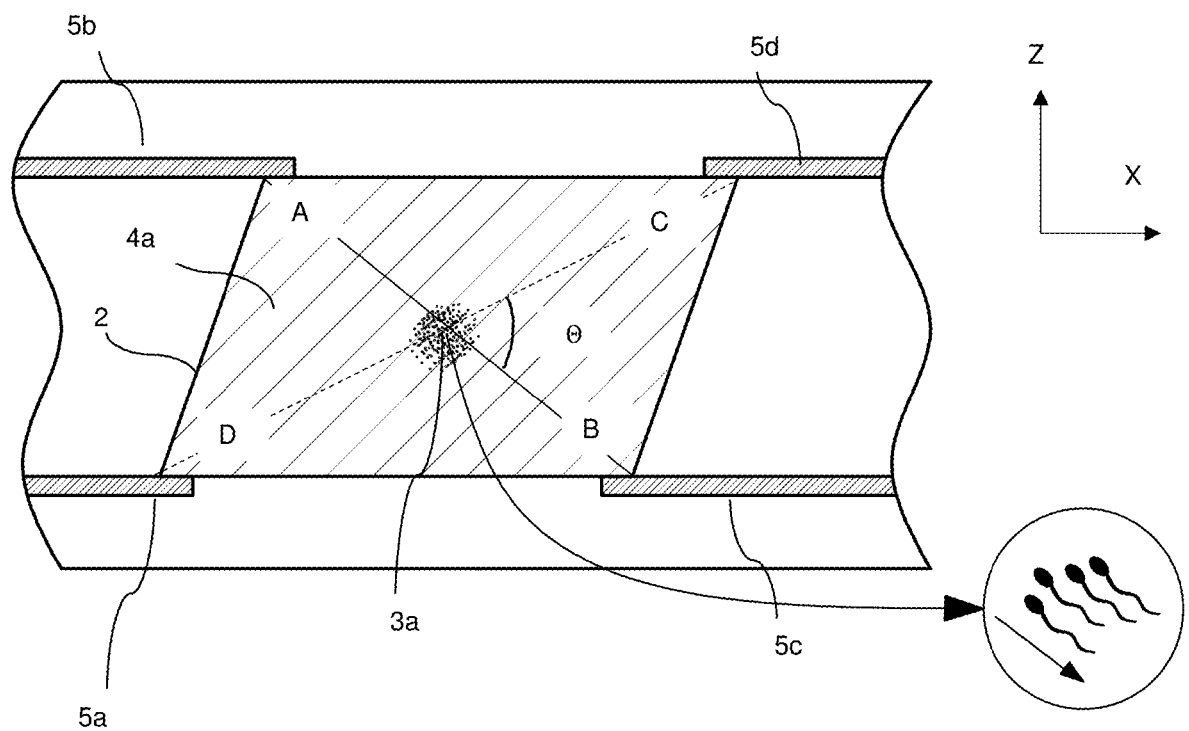
FIG. 14 shows two superimposed cross-sections through the line A-A' and line B-B' of another embodiment the microfluidic chip shown in FIG. 4b and having electrodes of varying shapes and producing a field with varying direction along the common channel.
Figure 15:
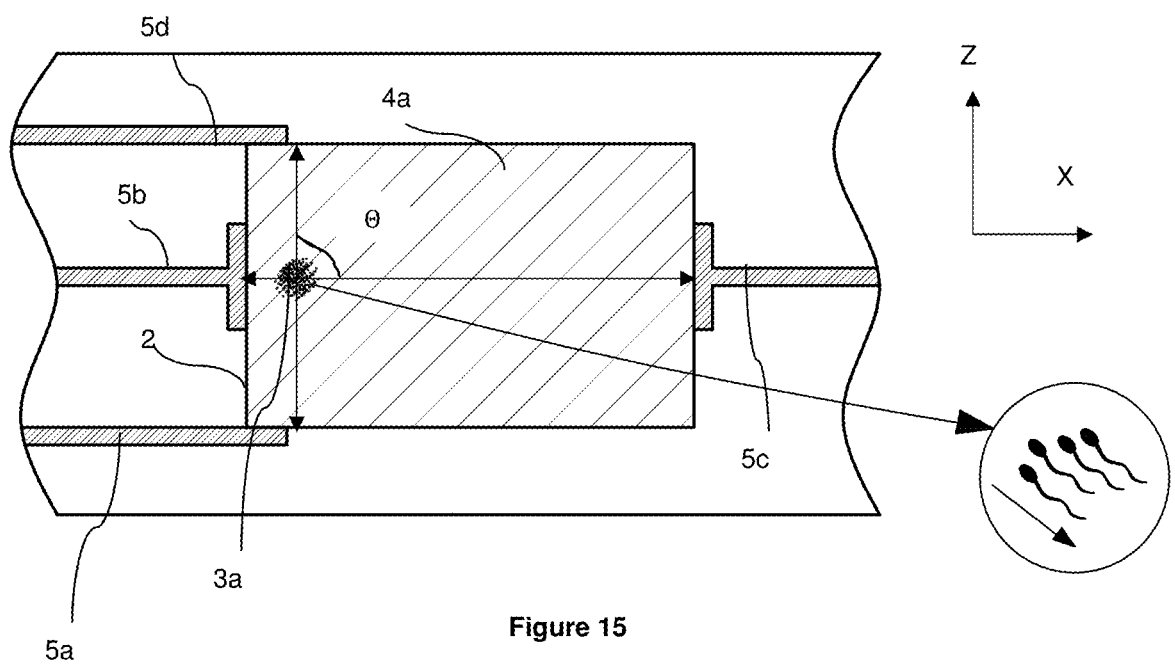
FIG. 15 shows two superimposed cross-sections through the line A-A' and line B-B' of another embodiment of the microfluidic chip shown in FIG. 4b and having electrodes of varying shapes and producing a field disposed asymmetrically in the common channel.

FIGS. 14 and 15 show cross-sections of two other embodiments of common microfluidic channel with different layout of the electrodes. The two sets of detection electrodes 5b and 5d are shown superimposed in the plane of the drawing, even though they are located at different positions along the microfluidic channel 2. In the embodiment of FIG. 14 the cross-section of the common microfluidic channel 2 has the shape of a parallelogram.

The sample fluid 3a does not need to be focused at the centre of the common channel 2. FIG. 15 shows embodiment with the common microfluidic channel 2 of near-rectangular cross-section with the sample fluid 3a located close to the vertical wall of the common microfluidic channel 2. In this embodiment the sample fluid 3a is not surrounded by the guidance fluid 4a at all the sides. In this the sample fluid 3a is making contact with the left wall of the channel, and the other sides of the sample fluid 3a are surrounded by the guidance fluid 4a. Most other embodiments discussed in this document show the examples of the common microfluidic channels 2 having the sample fluid being enveloped on all the sides by the guidance fluid 4a. This is not a necessary requirement. In the embodiment shown in FIG. 15, there are two sets of detection electrodes. The excitation electrode 5b and the signal electrode 5c producing the field between them along predominantly horizontal axis X; and the excitation electrode 5a and the signal electrode 5d producing predominantly vertical field along the Z-axis. The excitation electrodes 5a and 5b could be coupled to voltages of the same frequency or different frequencies. The excitation electrodes 5a and 5b could be energised at the same or different frequencies. In other aspects, the operation of this embodiment is similar to the ones described earlier. For example instead of one signal electrode 5d shown in FIG. 14 or 15, one could have two adjacent signal electrodes 5d and 5d' as in FIG. 6. The same applies to the excitation electrode. There could be two excitation electrodes 5a and 5a' instead of a single excitation electrode 5a. There are not visible in FIGS. 14 and 15 as they have the same projection in the plane of the drawing.

One can use the term cluster of particles/cells in the context of the present invention. This is to describe a small group of particles/cells, for example 2-20 particles/cells linked together by binding forces. For the purpose of this invention it shall be treated that such clusters are treated in the same way as single particles/cells.

Figures of this document show excitation electrodes and signal electrodes making direct contact with the interior of the common microfluidic channel. This does not have to be always the case and one could construct embodiment where some or all of these electrodes are electrically insulated from the interior of the common microfluidic channel. This embodiment could be more practical for operation at very high excitation frequencies, e.g. above 10 MHz.

The cross-section of the channel does not need to be rectangular or square. One could have circular, triangular, elliptical channel or indeed channels of various other cross-sections.

It is understood that cells addressed by the above description could be any live or dead cells, and non-mammalian mammalian cells, sperm cells, etc.

The use of hydrodynamic focusing is entirely optional. One may arrange the flow of sample fluid through the common microfluidic channel without any use of the guidance/sheath fluid.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A system for identification of particles/cells comprising: at least one microfluidic channel configured to sustain a flow of a sample fluid through said microfluidic channel and carrying the particles/cells along the channel in a one-by-one manner; at least a first group of detection electrodes and a second group of detection electrodes, wherein each group comprises at least one excitation electrode connected to an AC voltage/current source and at least one signal electrode connected to a detector: said first and second groups of detection electrodes generate different electric fields having two different directions channel and enable measurement of at least two electric characteristics of the individual particles/cells along two different directions defined by the directions of said electric fields: wherein each electric characteristic is measured between the signal electrode and the excitation electrode within each group of detection electrodes and where travelling particles/cells clear through the part of the microfluidic channel energized by the first group of detection electrodes before entering the part of the microfluidic channel energized by the second group of electrodes, and wherein the two groups of detection electrodes are positioned at different points along the flow direction and further comprising a means for exciting the excitation electrodes for different groups of detection electrodes at different frequencies.

2. The system of claim 1 wherein the directions of the electric fields created by the first and second groups of electrodes are substantially perpendicular.

3. The system of claim 1, wherein the detector connected to the signal electrode comprises a lock-in amplifier or phase-sensitive amplifier or demodulator tuned to a frequency ω of the AC voltage/current source.

4. The system of claim 1 wherein there is at least one shielding electrode positioned upstream from one group of detection electrodes and downstream from another group of detection electrodes.

5. The system of claim 1 wherein the particles/cells are mammalian cells or clusters of such cells.

6. The system of claim 5 wherein the cells are X- and Y-chromosome bearing semen cells and their identification implies identification of the sex of the cells.

7. A system for identification of particles/cells comprising:
at least one microfluidic channel configured to sustain a flow of a sample fluid through said microfluidic channel and carrying the particles/cells along the channel in a one-by-one manner;
at least a first group of detection electrodes and a second group of detection electrodes, wherein each group comprises at least one excitation electrode connected to an AC voltage/current source and at least one signal electrode connected to a detector;
said first and second groups of detection electrodes generate different electric fields having two different directions
and enable measurement of at least two electric characteristics of the individual particles/cells along two different directions defined by the directions of said electric fields;
wherein each electric characteristic is measured between the signal electrode and the excitation electrode within each group of detection electrodes and where travelling particles/cells clear through the part of the microfluidic channel energized by the first group of detection electrodes before entering the part of the microfluidic channel energized by the second group of electrodes, and
wherein the two groups of detection electrodes are positioned at different points along the flow direction, and
further comprising a third group of detection electrodes having at least one excitation electrode and at least one signal electrode; and the directions of the electric fields created by the first, second and third groups are substantially non-collinear, and
wherein each of the excitation electrodes in the first, second or third group of detection electrodes comprises at least two sub-electrodes connected to the same AC voltage/current source and at least two signal electrodes in each group of detection electrodes connected a differential amplifier configured for improved signal-to-noise ratio.

8. The system of claim 7 wherein the detector connected to the signal electrodes comprises a narrow-band-pass amplifier tuned to a frequency ω of the AC voltage/current source connected to the excitation electrode of the same group of detection electrodes.

9. A system for identification of particles/cells comprising:
at least one microfluidic channel configured to sustain a flow of a sample fluid through said microfluidic channel and carrying the particles/cells along the channel in a one-by-one manner;
at least a first group of detection electrodes and a second group of detection electrodes, wherein each group comprises at least one excitation electrode connected to an AC voltage/current source and at least one signal electrode connected to a detector;

said first and second groups of detection electrodes generate different electric fields having two different directions and enable measurement of at least two electric characteristics of the individual particles/cells along two different directions defined by the directions of said electric fields;

wherein each electric characteristic is measured between the signal electrode and the excitation electrode within each group of detection electrodes and where travelling particles/cells clear through the part of the microfluidic channel energized by the first group of detection electrodes before entering the part of the microfluidic channel energized by the second group of electrodes, and wherein the two groups of detection electrodes are positioned at different points along the flow direction, and further comprising a module that calculates a weighted vector sum of the signals measured by each group of the detection electrodes, such vector sum is determined by the angle between the directions of the fields created by each group of detection electrodes and making the calculation for single passing particle/cell; and identifying of the particle/cell on the basis on an analysis of said calculation.

10. A system for identification of particles/cells comprising:

at least one microfluidic channel configured to sustain a flow of a sample fluid through said microfluidic channel and carrying the particles/cells along the channel in a one-by-one manner; at least a first group of detection electrodes and a second group of detection electrodes, wherein each group comprises at least one excitation electrode connected to an AC voltage/current source and at least one signal electrode connected to a detector: the first and second groups of detection electrodes generate different electric fields having two different directions and are configured to enable measurement of at least two electrical characteristics of the individual particles/cells along two different directions defined by the directions of said electric fields; wherein each electrical characteristic is measured between the signal electrode and the excitation electrode within each group of detection electrodes and where travelling particles/cells clear through the part of the microfluidic channel energized by the first group of detection electrodes before entering the part of the microfluidic channel energized by the second group of electrodes, and wherein the excitation electrodes of first group of detection electrodes and the second group of detection electrodes generate the AC voltage at different frequencies.

11. The system of claim 10, wherein the microfluidic channel has a rectangular cross section.

12. The system of claim 11 further comprising at least one shielding electrode positioned along the longitudinal axis of the microfluidic channel and configured to reduce electrical signal noise induced in the detection electrodes and improve signal detection.

13. A system for identification of particles/cells comprising:

at least one microfluidic channel configured to sustain a flow of a sample fluid through said microfluidic channel and carrying the particles/cells along the channel in a one-by-one manner;

at least a first group of detection electrodes and a second group of detection electrodes, wherein each group comprises at least one excitation electrode connected to an AC voltage/current source and at least one signal electrode connected to a detector;

the first and second groups of detection electrodes generate different electric fields having two different directions and are configured to enable measurement of at least two electrical characteristics of the individual particles/cells along two different directions defined by the directions of said electric fields;

wherein each electrical characteristic is measured between the signal electrode and the excitation electrode within each group of detection electrodes and where travelling particles/cells clear through the part of the microfluidic channel energized by the first group of detection electrodes before entering the part of the microfluidic channel energized by the second group of electrodes, and wherein the excitation electrode in the first group of detection electrodes is electrically excited at a different operating frequency than the excitation electrode in the second group of detection electrodes.

14. The system of claim 13, wherein the signal electrode of both the first group of detection electrodes and the second group of detection electrodes is electrically coupled to a lock-in amplifier to measure the phase characteristics of the signal generated by a cell passing through the microfluidic channel.

* * * * *